(12) United States Patent  (10) Patent No.: US 7,771,797 B2
Tabata et al.  (45) Date of Patent: Aug. 10, 2010

(54) PHOTOCATALYST MATERIAL PRODUCING METHOD AND PHOTOCATALYST MATERIAL PRODUCING APPARATUS

(75) Inventors: Yoichiro Tabata, Tokyo (JP); Tetsuya Saitsu, Tokyo (JP); Yujiro Okihara, Tokyo (JP); Ryohei Ueda, Tokyo (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 730 days.

(21) Appl. No.: 10/588,735

(22) PCT Filed: Jul. 15, 2005

(86) PCT No.: PCT/JP2005/013170

§ 371 (c)(1),
(2), (4) Date: Jan. 25, 2007

(87) PCT Pub. No.: WO2007/010594

PCT Pub. Date: Jan. 25, 2007

(65) Prior Publication Data

US 2008/0251012 A1    Oct. 16, 2008

(51) Int. Cl.
  *H05H 1/32* (2006.01)
(52) U.S. Cl. .............. 427/540; 427/569; 427/580; 118/638; 118/723 R; 118/723 E
(58) Field of Classification Search .......... 427/540, 427/569, 580; 118/638, 723 R, 723 E
See application file for complete search history.

(56) References Cited

U.S. PATENT DOCUMENTS 6,154,311 A * 11/2000 Simmons et al. ............ 359/359

6,436,542 B1    8/2002 Ogino et al.
6,810,575 B1 * 11/2004 Saito et al. .................... 29/622
2002/0172628 A1 * 11/2002 Segawa et al. .......... 422/186.04
2003/0039848 A1 *  2/2003 Murata et al. ............... 428/448

(Continued)

FOREIGN PATENT DOCUMENTS

JP    10-202776 A    8/1998
JP    2001-73116 A   3/2001

(Continued)

OTHER PUBLICATIONS

Di Paola, A., et al., "Preparation of photocatalytic brookite thin films". Thin Solid Films 515 (2007) pp. 3527-3529.*

*Primary Examiner*—Bret Chen
(74) *Attorney, Agent, or Firm*—Sughrue Mion, PLLC

(57) ABSTRACT

This invention provides a new photocatalyst material producing apparatus and photocatalyst material producing method that can produce a large quantity of photocatalyst material of high quality by a chemical reaction in light high-field plasma in a highly oxidative high-concentration ozone medium state, instead of systems to produce a photocatalyst material by PVD and CVD, which are conventional dry deposition methods.

In a photocatalyst material producing method and photocatalyst material producing apparatus according to this invention, a pair of facing electrodes are provided via a dielectric material in a discharge gap where gas mainly containing oxygen gas is supplied, and an AC voltage is applied between the electrodes to generate dielectric barrier discharge (silent discharge or creeping discharge) in the discharge gap. Thus, oxygen gas containing ozone gas is created and a metal or metal compound is modified to a photocatalyst material by the dielectric barrier discharge.

26 Claims, 15 Drawing Sheets

U.S. PATENT DOCUMENTS

| | | | |
|---|---|---|---|
| 2004/0223893 A1* | 11/2004 | Tabata et al. | 422/186.07 |
| 2005/0003110 A1* | 1/2005 | Tanaka et al. | 428/1.23 |
| 2005/0095356 A1* | 5/2005 | Nakamura et al. | 427/58 |
| 2005/0153107 A1* | 7/2005 | Iijima | 428/195.1 |
| 2005/0257687 A1* | 11/2005 | Tanaka et al. | 96/15 |
| 2006/0049738 A1* | 3/2006 | Tabata et al. | 313/362.1 |
| 2007/0026580 A1* | 2/2007 | Fujii | 438/149 |
| 2007/0251811 A1* | 11/2007 | Sahle-Demessie et al. | 204/157.6 |

FOREIGN PATENT DOCUMENTS

| | | | |
|---|---|---|---|
| JP | 2001-104798 A | | 4/2001 |
| JP | 2001-187390 | * | 7/2001 |
| JP | 2002-348665 A | | 12/2002 |
| JP | 2003-112949 A | | 4/2003 |
| JP | 2003-321782 A | | 11/2003 |
| JP | 2004-137101 A | | 5/2004 |
| WO | WO 97/10186 A1 | | 3/1997 |

* cited by examiner

|  | QUARTZ (SiO2) | ALUMINA (Al2O3) | TiO2 (ANATASE) | TiO2 (RUTILE) | TUNGSTEN OXIDE (WO3) |
|---|---|---|---|---|---|
| ENERGY GAP | 7.8eV | 7.0eV | 3.2eV | 3.0eV | 2.8eV |
| ABSORPTION WAVELENGTH OF PHOTOCATALYTIC EFFECT | 159nm (VACUUM ULTRAVIOLET) | 177nm (VACUUM ULTRAVIOLET) | 388nm (ULTRA-VIOLET) | 413nm (VISIBLE) | 443nm (VISIBLE) |

|  | IRON OXIDE (Fe2O3) | CHROMIUM OXIDE (Cr2O3) | CuO | In2O3 | Fe2TiO3 |
|---|---|---|---|---|---|
| ENERGY GAP | 2.2eV | 2.07eV | 2.2eV | 2.5eV | <2.8eV |
| ABSORPTION WAVELENGTH OF PHOTOCATALYTIC EFFECT | 564nm (VISIBLE) | 600nm (VISIBLE) | 564nm (VISIBLE) | 496nm (VISIBLE) | 443nm (VISIBLE) |

|  | PbO | V2O5 | FeTiO3 | Bi2O3 | Nb2O3 |
|---|---|---|---|---|---|
| ENERGY GAP | 2.8eV | 2.8eV | 2.8eV | 2.8eV | 3.0eV |
| ABSORPTION WAVELENGTH OF PHOTOCATALYTIC EFFECT | 443nm (VISIBLE) | 443nm (VISIBLE) | 443nm (VISIBLE) | 443nm (VISIBLE) | 413nm (VISIBLE) |

|  | SrTiO3 | ZnO | BaTiO3 | CaTiO3 | SnO2 |
|---|---|---|---|---|---|
| ENERGY GAP | 3.2eV | <3.3eV | 3.3eV | 3.4eV | 3.6eV |
| ABSORPTION WAVELENGTH OF PHOTOCATALYTIC EFFECT | 388nm (ULTRA-VIOLET) | 376nm (ULTRA-VIOLET) | 376nm (ULTRA-VIOLET) | 365nm (ULTRA-VIOLET) | 344nm (ULTRA-VIOLET) |

FIG. 15

PHOTOCATALYST MATERIAL PRODUCING METHOD AND PHOTOCATALYST MATERIAL PRODUCING APPARATUS

TECHNICAL FIELD

This invention relates to a photocatalyst material producing method and a photocatalyst material producing apparatus for producing a photocatalyst material of high quality.

BACKGROUND ART

Photocatalyst materials are particularly excellent in their substance decomposition ability and ultra-hydrophilicity function. Utilizing such function, photocatalyst materials are used for air purification, water purification, decomposition of organic substances, and anti-fogging and anti-soiling coating material.

Methods and apparatuses for producing such photocatalyst materials are classified into two types: dry deposition methods and wet deposition methods.

As dry deposition methods, there are PVD (physical vapor deposition) and CVD (chemical vapor deposition). As photocatalyst producing methods based on PVD, there have been Patent References 1 and 2. As photocatalyst producing methods based on CVD, there have been Patent References 3 and 4 and the like.

As wet deposition methods, there have been sol-gel methods (Patent References 4 and 6) and coating methods (patent References 5 and 6).

In the PVD method of Patent Reference 1, when the oxygen concentration is set at 10 to 50% in a reaction space in a depressurized state of 0.4 to 3 Pa, which is close to vacuum, Ti,Si metal is installed as a target. Depressurized plasma is formed by 30-kW high-frequency magnetrons in the reaction space, and particles sputtered from the target are oxidized by the plasma, thus forming a photocatalyst film on a substrate.

In the PVD method of Patent Reference 2, ozone gas emitted from a double-tube ozonizer is used. When oxygen and ozone pressure division is performed to 0.01 to 2 Pa in a reaction space in a depressurized state of 3 Pa or less, which is close to vacuum, Ti,Si metal is installed as a target. By a sputtering device that is caused to discharge DC magnetrons, depressurized plasma is formed in the reaction space and particles sputtered from the target are oxidized by the plasma, thus forming a photocatalyst film on a substrate.

Patent References 3 and 4 disclose photocatalyst film forming methods based on thermal CVD methods. In these methods, deposition component gas (for example, Ti (OiPr)) and nitrogen (2% $NH_3$) are preheated at 180° C. and supplied into a CVD device, and react with oxygen gas of approximately 0.012 MPa supplied in the CVD device, thus forming a photocatalyst material film (in this case, $TiO_2$) on the surface of a processing subject heated to several hundred degrees.

In the sol-gel methods of Patent References 4 and 6, a glass is coated with Ti(OEt)4-EtOH-36% HCL solution and dried at several hundred degrees for several minutes to form a film, which is baked at a predetermined temperature to form a photocatalyst material of TiO2. As the coating materials, TiO2 sol and various crystalline precursors are subjects of patent.

The coating methods of Patent References 5 and 6 are methods of coating a substrate with liquid containing a TiO2 material to from a film and then heating and gradually cooling to lower the temperature, thus forming a photocatalyst material.

Meanwhile, there are Patent References 7 to 11 as prior arts utilizing photocatalyst and discharge.

In Patent Reference 7, inert gas and oxidative gas are supplied into a vacuum container, and crystalline titanium oxide is produced by a sputtering method based on continuous discharge plasma such as glow discharge at a low pressure.

Patent Reference 8 discloses a producing method in which a target source such as titanium oxide to be a photocatalyst film material is provided in vacuum and sputtering is performed using high-frequency discharge equivalent to continuous discharge plasma in a low-pressure dilute gas.

Patent Reference 9 discloses a method of manufacturing an amorphous photocatalyst film by sputtering a sintered conductive target such as titanium oxide and niobium oxide, tantalum oxide and the like in an atmosphere that can be depressurized.

In Patent Reference 10, the surface of a substrate is coated with titanium-containing oxide or the like and nitrided by AC glow discharge, which is continuous discharge plasma, in a mixed gas containing ammonium gas and nitrogen gas at an atmospheric pressure, thus modifying the photocatalyst film.

Patent Reference 11 discloses a device that produces ozone by increasing dissociation of oxygen compound gas and oxygen compound or acceleration of dissociation of oxygen gas by oxygen compound gas or oxygen compound and discharge light, and suggests that if metals are laminated and dielectric barrier discharge (silent discharge) is caused to generate ozone, a metal oxide film (photocatalyst material) is formed.

Patent Reference 1: JP-A-2002-348665
Patent Reference 2: JP-A-2001-073116
Patent Reference 3: JP-A-10-202776
Patent Reference 4: JP-T-11-512337
Patent Reference 5: JP-A-2003-1129490
Patent Reference 6: Japanese Patent No. 2,756,474
Patent Reference 7: JP-A-2004-137101
Patent Reference 8: JP-A-2001-104798
Patent Reference 9: JP-A-2001-25666
Patent Reference 10: JP-A-2003-321782
Patent Reference 11: JP-A-2004-359537

DISCLOSURE OF THE INVENTION

Problems that the Invention Is to Solve

As described above, various photocatalyst material producing methods and apparatuses have been developed. However, in any of these, it is difficult to increase the area of the photocatalyst material, to produce a large quantity of photocatalyst material, and to supply a photocatalyst material of stable quality. Moreover, it is difficult to produce a photocatalyst material of higher quality, that is, a photocatalyst material having constant film quality, and there are problems such that the producing process is complicated, highly increasing the cost of the photocatalyst material per unit area.

In order to solve the problems as described above, this invention is to provide a photocatalyst material producing method and a photocatalyst material producing apparatus that enable realization of high-field intermittent plasma by dielectric barrier discharge (silent discharge or creeping discharge) and that enable production of a photocatalyst material of very good quality by using the very reactive oxidation ability of activated oxygen or ozone of oxygen atoms, and nitrogen atoms and an activated nitrogen substance such as NOx.

Means for Solving the Problems

A photocatalyst material producing method according to this invention includes forming a discharge zone with a discharge gap part defined therein by first and second electrodes facing each other and arranging a dielectric material on a surface of the first electrode facing to the second electrode, coating the second electrode or the surface of the dielectric material with a metal or metal compound to be a photocatalyst material, supplying oxygen gas into the discharge gap part, applying an AC voltage between the first electrode and the second electrode to introduce AC power of a predetermined power density into the discharge zone, causing dielectric barrier discharge (silent discharge or creeping discharge) via the dielectric material, creating a state where oxygen gas and ozone gas exist in the discharge gap part, and modifying the surface of the dielectric material or the surface of the second electrode contacting the discharge gap part to an oxidized surface by a mutual chemical reaction of high-field intermittent discharge plasma due to the dielectric barrier discharge (silent discharge or creeping discharge) and oxygen gas and ozone gas, thus adhering a photocatalyst material to the surface of the dielectric material or the metal surface.

Also, a photocatalyst material producing method according to this invention includes forming a discharge zone with a discharge gap part defined therein by first and second electrodes facing each other and arranging a dielectric material on a surface of the first electrode facing to the second electrode, supplying staring material gas containing metal particles or metal compound gas to be a photocatalyst element in oxygen gas to the discharge gap part, applying an AC voltage between the first electrode and the second electrode to introduce AC power of a predetermined power density into the discharge zone, causing dielectric barrier discharge (silent discharge or creeping discharge) via the dielectric material, creating a state where oxygen gas and ozone gas exist in the discharge gap part, and modifying the metal particles or the metal compound gas contained in the oxygen gas to photocatalyst particles by a mutual chemical reaction of high-field intermittent discharge plasma due to the dielectric barrier discharge (silent discharge or creeping discharge) and oxygen gas and ozone gas.

Moreover, a photocatalyst material producing apparatus according to this invention includes: a photocatalyst material producing unit housing a first electrode, a second electrode facing this first electrode to form a discharge zone with a discharge gap part defined therein, and a dielectric material arranged on a surface of the first electrode facing to the second electrode; oxygen supply means that supplies oxygen gas into the discharge gap part in the photocatalyst material producing unit; and an AC power source that applies an AC voltage between the first electrode and the second electrode to introduce AC power of a predetermined power density into the discharge zone and causes dielectric barrier discharge (silent discharge or creeping discharge) via the dielectric material; wherein a metal or metal compound to be a photocatalyst material is applied to the second electrode or the surface of the dielectric material, a state where oxygen gas and ozone gas exist in the discharge gap part is created by the dielectric barrier discharge, and the surface of the dielectric material or the surface of the second electrode contacting the discharge gap part is modified to an oxidized surface by a mutual chemical reaction of high-field intermittent discharge plasma due to the dielectric barrier discharge (silent discharge or creeping discharge) and oxygen gas and ozone gas, thus adhering a photocatalyst material to the surface of the dielectric material or the metal surface.

Also, a photocatalyst material producing apparatus according to this invention includes: a photocatalyst material producing unit housing a first electrode, a second electrode facing this first electrode to form a discharge zone with a discharge gap part defined therein, and a dielectric material arranged on a surface of the first electrode facing to the second electrode; starting material gas supply means that supplies starting material gas containing metal particles or metal compound gas to be a photocatalyst element in oxygen gas to the discharge gap part in the photocatalyst material producing unit; and an AC power source that applies an AC voltage between the first electrode and the second electrode to introduce AC power of a predetermined power density into the discharge zone and causes dielectric barrier discharge (silent discharge or creeping discharge) via the dielectric material; wherein a state where oxygen gas and ozone gas exist in the discharge gap part is created by the dielectric barrier discharge (silent discharge or creeping discharge), and the metal particles or the metal compound gas contained in the oxygen gas is modified to photocatalyst particles by a mutual chemical reaction of high-field intermittent discharge plasma due to the dielectric barrier discharge (silent discharge or creeping discharge) and oxygen gas and ozone gas.

Advantage of the Invention

According to the photocatalyst material producing method and the photocatalyst material producing apparatus according to this invention, since a photocatalyst material film is produced by using high-field discharge, which is dielectric barrier discharge, in an atmosphere containing highly oxidative high-concentration ozone and oxygen atoms, a high-quality photocatalyst material that is uniform and thick and has no unevenness on its modified surface can be produced on the discharge surface, and the method and apparatus are effective in the case where a photocatalyst material film having a large area is necessary or in the case where reduction in the cost of the photocatalyst material film is demanded.

Moreover, since an oxide film is formed by highly oxidative high-concentration ozone and oxygen atoms, the method and apparatus have an effect that a photocatalyst material can be easily produced with an oxidation-resistant material and are effective for producing a broader range of photocatalyst materials.

BEST MODE FOR CARRYING OUT THE INVENTION

Embodiment 1

Embodiment 1 of this invention will be described with reference to FIG. 1 and FIGS. 3 to 10. In the drawings, the same reference numeral represents the same or equivalent part.

FIG. 1 is a structural block diagram for explaining a photocatalyst material producing method and apparatus according to Embodiment 1 of this invention. In FIG. 1, an oxidation starting material gas supply system that supplies oxygen (starting material gas) having a purity of 99.99% or higher includes a high-purity oxygen cylinder 8, an oxygen regulating valve 81 and the like, and fills a photocatalyst material producing unit 7 at a predetermined pressure. The photocatalyst producing unit 7 houses first and second electrodes 1, 2 forming a discharge zone with a discharge gap part 4 defined therein, and a dielectric material 3 arranged on the surface of the electrode 1 facing the electrode 2. Metals or compound materials 5, 6 to form a photocatalyst material film are fixed by coating or spraying to the dielectric material 3 and a gas passage surface of the electrode 1 forming the discharge zone (wall surface of discharge zone=wall surface of reaction space).

Then, an AC voltage, which is a high voltage, is applied between the electrodes 1, 2 in the photocatalyst material producing unit 7 by a high-frequency AC power source 900, and dielectric barrier discharge (silent discharge) via the dielectric material 3 is generated between the two electrodes 1, 2. The high-frequency AC power source 900 mainly includes a converter part 901, an inverter part 902, and a transformer part 903.

That is, in the photocatalyst material producing unit 7, a high-voltage AC voltage is applied between the electrodes 1, 2 in the discharge zone with a gap of 0.1 mm, which is a reaction space, to generate dielectric barrier discharge, and oxygen gas that is a part of the starting material gas is dissociated to oxygen atoms. The gas pressure in the reaction space is maintained at approximately 0.1 MPa to approximately 0.4 MPa to accelerate the coupling action of the dissociated oxygen atoms with the other oxygen atoms, thus converting the gas to high-concentration ozone gas.

Also, the photocatalyst material producing unit 7 has cooling means using water or the like to cool the electrodes that generate heat because of discharge, but here the cooling means is not shown in the drawing. In the drawing, only one discharge cell part is shown. However, in the actual apparatus, discharge cells as shown in the drawing are stacked in the form of multiple stages, providing gas passages in parallel, and the plural discharge cells are caused to perform discharge.

According to the photocatalyst material producing method and apparatus according to this Embodiment 1, as a result of examining the chemical reaction process by the discharge using the oxidation starting material gas and the quality of the discharge surface of the electrode based on the high-field discharge by dielectric barrier discharge and highly oxidative high-concentration ozone and oxygen atoms, it is found that the discharge surface has been modified to a photocatalyst material film of very good quality.

It is found that the metal or compound material applied to the electrode surface has been changed into a strongly coupled oxide film and modified to a photocatalyst material film having an amorphous structure in which the applied crystal metal is uniform.

As the discharge surface is modified to a photocatalyst material film having a uniform amorphous structure, the photocatalyst material absorbs intense light of discharge light and thus accelerates the dissociation of oxygen molecules by the photocatalytic effect. More oxygen atoms are created and much ozone is produced. The oxidation of the discharge surface is accelerated by the synergistic effect and it can be modified to a photocatalyst material film of better quality.

In FIG. 3, in addition to the apparatus of FIG. 1, an auxiliary gas cylinder 8A that supplies dilute gas of helium or argon gas or the like, other than oxidation gas or nitriding gas 10 such as oxygen gas or nitrogen gas, is provided, and the dilute gas can be supplied from a gas supply unit 10A.

After a photocatalyst material is formed on the discharge space surface by generating dielectric barrier discharge of high power density at a pressure 0.1 MPa to 0.4 MPa using the oxidation gas or nitriding gas such as oxygen gas or nitrogen gas, the oxygen gas or nitrogen gas in the apparatus is replaced again by dilute gas that is inert gas. As dielectric barrier discharge of low power density is generated in the dilute gas atmosphere, annealing of the produced photocatalyst material is performed to further stabilize the photocatalyst material. In this manner, by adding the low-density dielectric barrier discharge process using inert gas to the dielectric barrier discharge process using oxygen gas, nitrogen gas or the like, it is possible to produce a photocatalyst material of higher quality.

Next, the photocatalyst material production mechanism in dielectric barrier discharge with high-concentration ozone and oxygen atoms will be described, which is a characteristic feature of this invention. The discharge mode and characteristics of dielectric barrier discharge will be described with reference to FIG. 4. The mechanism through which the material of the discharge surface is modified to a photocatalyst material, based on one type of micro-discharge in the discharge mode of FIG. 4, and the primary elements of the modification will be described with reference to FIGS. 5 and 6. The field strength of dielectric barrier discharge, the production of high-concentration ozone and oxygen atoms, and the operations and actions up to the point where a photocatalyst thin film is produced on the discharge surface will be described with reference to FIGS. 7, 8, 9 and 10.

First, photocatalyst materials are typically metal oxide materials as shown in FIG. 15. They have different band gaps depending on the metal and have different light absorption spectra in accordance with the difference in the quality of photocatalyst material. In short, the optical wavelength that can achieve photocatalytic effects such as the ability to decompose harmful substances is different among the photocatalyst materials. Also, it has been found that the performance of the photocatalyst material for decomposing harmful substances is largely affected not only by the wavelength of light and light intensity but also by the crystal structure of the photocatalyst material itself and whether a photocatalyst of good quality with few defects can be provided or not, and that the performance largely depends on the surface area or the like of the photocatalyst material. However, in the conventional photocatalyst material producing method, it is difficult to significantly improve the performance of the photocatalyst material, though it can be slightly enhanced by improving the production process control. Also, while a method of producing a photocatalyst material by discharge plasma has been found, a DC glow discharge system is employed as a method for forming discharge plasma, and a photocatalyst material is produced by a continuous sustained discharge system with a discharge gap length of 1 mm or more and a gas pressure of 1 atm. (0.1 MPa) or less. Therefore, the fact is that a photocatalyst material having a good crystal structure cannot be provided.

FIG. 4 schematically shows the discharge mode of dielectric barrier discharge. The operations and actions in the discharge mode of dielectric barrier discharge will be described. A structure for cooling the electrode surfaces by flowing cooling water through the insides of the facing electrodes 1, 2 is employed, and an AC voltage is applied between the electrodes 1, 2 by the AC power source 900.

Then, in the state where the dielectric material 3 provided between the electrodes 1, 2 has its phase shifted by 90 degrees from the applied AC voltage, electric charges are polarized and induced onto both surfaces of the dielectric material 3 with a thickness da, as shown in FIG. 4. (FIG. 4 shows a schematic view in the case where a positive electric potential is applied to the electrode 2.)

In short, as an AC voltage V is applied between the electrodes 1, 2, maximum polarized charges $Q_{max}$ are accumulated in the discharge space when the value of $(dV/dt)$ reaches the maximum. At that time, a maximum field strength $E_{max}$ is applied to the discharge gap dg.

If the field strength $E_c$ for causing dielectric breakdown of the discharge gap dg is made smaller than $E_{max}$, partial dielectric breakdown occurs in the discharge gap dg at a very small part of the facing low-voltage electrode 1 at the polarized charge $Q_c$ point when the field strength $E_c$ is reached. The polarized charges $Q_c$ accumulated in the dielectric material 3 are discharged to the low-voltage electrode 1 at a predetermined discharge voltage $V_j$. When the polarized charges Qc are eliminated, the discharge is immediately stopped and the discharge gap dg is recovered from the partial dielectric breakdown.

Then, the dielectric material 3 is charged again up to the polarized charged Qc point. When the polarized charges reach Qc, partial dielectric breakdown occurs again in the discharge gap dg and the discharge at the discharge voltage Vj is repeated.

The ON-OFF discharge of repeating partial dielectric breakdown (discharge) and recovery in this discharge space is called dielectric barrier discharge.

Since electric charges are accumulated evenly on the entire surface of the dielectric material 3 facing the electrode 1, the dielectric barrier discharge, which is irregular ON-OFF discharge, is characterized by occurring evenly on the entire surface of the discharge gap dg and is also characterized by being a micro and short-period sustained discharge using electric charged accumulated on the very small surface of the dielectric material 3.

One discharge diameter of dielectric barrier discharge depends on the gas pressure P, gas temperature, gas type and the like in the discharge gap, but it may be approximately several ten μm. The discharge cross section may be approximately several nm². The duration Tg of single dielectric barrier discharge is shorter as the discharge gap length dg and the gas pressure P are smaller. At discharge gap length of 0.1 mm and a gas pressure of approximately 0.1 MPa, typically, the duration may be approximately of nanoseconds.

The structure and mechanism of the apparatus for modification to the photocatalyst material of this invention utilizing the features proper to dielectric barrier discharge shown in FIG. 4 will be described with reference to FIGS. 5 and 6.

Dielectric barrier discharge is micro-discharge and it repeats very short-period sustained discharge intermittently for innumerable times in terms of time and space. Therefore, a discharge chemical reaction that cannot be realized by glow discharge or arc discharge, which is sustained discharge, can be realized. The discharge gas can produce oxidative substances such as ozone and NOx and can produce activated atoms of oxygen atoms, nitrogen atoms or the like based on dissociation of oxygen, nitrogen and like molecules. It is found that, on the discharge gap surface, the material surface is modified to an extremely unique physical state by the surface chemical reaction by the thermal energy due to the discharge, the ozone and NOx gas produced by the discharge, and the produced activated atoms.

FIG. 5 schematically shows a case where the metals or compound materials 5, 6, which are materials to be processed, are applied onto the surfaces of the electrode 1 and the dielectric material 3, which are discharge gap surfaces of single dielectric barrier discharge a.

When a voltage V is applied between the electrodes 1, 2, an electric potential that is voltage-divided to Va is applied into the dielectric material and an electric potential that is voltage-divided to Vb is applied into the discharge gap dg.

On the assumption that discharge is repeated innumerable times at a discharge keeping voltage Vj, the electric potential Vb applied into the discharge gap dg substantially coincides with the discharge keeping voltage Vj. When micro-discharge of approximately Tg (nanoseconds) occurs from electric charges Q accumulated in a very small space on the surface of the dielectric material, the discharge thermal energy J generated by single micro-discharge is discharge thermal energy $J = \Delta I \times V_j \times T_g$ [J]

and during the very short time period Tg, most of the discharge thermal energy of approximately several nJ is intensively injected onto the end surface of the discharge gap dg of the micro-discharge surface.

In such a state, as shown in FIG. 5, when the very small discharge surfaces coated with the materials to be processed 5, 6, equivalent to the end surfaces of the discharge gap dg are overheated to approximately several hundred degrees in a short time and the discharge is stopped, the discharge surfaces are immediately and quickly cooled to a normal temperature by the cooling water flowed on the electrode surfaces. Thus, the materials to be processed, which had a crystal structure, transform into amorphous materials.

If oxygen as oxidation gas or nitrogen gas as nitriding gas is added at the same time into the discharge gap dg, ozone gas or oxygen atoms of activated oxygen having oxidation ability that is several thousand times that of oxygen gas are produced in the discharge gap dg by a discharge light action of ultra-high luminance generated by the high-field discharge of the dielectric barrier discharge. From the nitrogen gag, NOx gas or nitrogen atoms are produced.

In this manner, a very unique gas space is realized in the chemical reaction in which ozone, oxygen atoms, NOx gas or nitrogen atoms exist at a high concentration. It is found that, in this unique gas space, not only the physical state is transformed to the amorphous state by the discharge but also the oxidation of the applied materials to be processed is accelerated by the ozone or oxygen atoms and the like having very high oxidation ability, thus easily forming a photocatalyst oxide film or nitride film of very good quality.

FIG. 7 shows the field strength E/N (Td) characteristic of the discharge that differs among various discharge modes with respect to the discharge gap length dg (mm) between the electrodes where a voltage is applied.

In the drawing,

E (V/cm) represents the voltage per 1-cm gap length, n (cm³) represents the gas density in the discharge space, and the field strength 1 (Td) is equal to (=) $1 \times 10^{17}$ (V*cm²)

Normally, in continuous plasma at an atmospheric pressure (0 MPa) or higher, the field strength E/n value by the discharge is 50 (Td) or less.

For example, in atmospheric-pressure glow discharge, the discharge keeping voltage Vj of approximately 200 to 500 V is converted to a field strength of approximately 20 to 50 Td. In atmospheric-pressure arc discharge, since the discharge keeping voltage Vj is approximately several ten V, it is converted to a field strength of approximately 10 Td, which is very small.

On the other hand, the dielectric barrier discharge (silent discharge) provides intermittent plasma as described in the above principle. Therefore, it has characteristic features that the discharge keeping voltage Vj is several times higher than in glow discharge or arc discharge, which provides continuous plasma, and that a very large field strength E/n can be achieved.

Moreover, the characteristic of field strength E/n achieved by the dielectric barrier discharge largely depends on the gas pressure P in the discharge gas and the discharge gap length dg (see FIG. 7).

From the test that we conducted, it is found that the field strength E/n of the discharge must be at least 120 Td or more, as a condition that enables formation of a photocatalyst oxide film or nitride film of very good quality and highly efficient film formation (short-time formation).

In short, from the characteristics shown in FIG. 7, it is found that even in a dielectric barrier discharge zone, the high field E/n of 120 Td or higher cannot be provided under the conditions of long discharge gap length dg and high gas pressure P, which are consequently not appropriate to the photocatalyst material producing method and apparatus of this invention.

In FIG. 7, as the gas pressure P is set at 0.2 MPa and dg is set at 0.6 mm or less, the field strength E/n suddenly rises from 120 Td. (For example, under the conditions of gas pressure of 0.25 MPa and gap length dg of 0.1 mm, the field strength E/n is approximately 200 Td.)

As the discharge zones where the field strength E/n is 120 Td or higher, there are two zones, that is, zone X where the discharge gap length is 1 mm or less and zone Y where the gas pressure P is low.

In the zone X, the gas pressure is equal to or higher than the atmospheric pressure (0 MPa) and dg is less than 1 mm. A particularly good condition range is dg of 0.6 mm or less.

In the zone Y, the discharge gap length may be as long as approximately 1 mm to several mm, but the gas pressure must be within the range of 0.1 MPa or less. Within this range, a particularly good gas pressure P range is a depressurized (vacuum) range equal to or less than the atmospheric pressure (0 MPa).

In this manner, as the discharge having very high field strength E/n is realized, electrons in the discharge are accelerated to a very high speed and the plasma in the discharge space becomes imbalanced plasma. Thus, discharge light having high luminance and shifted toward shorter wavelength is realized. This discharge light (for example, ultraviolet rays) with high luminance and short wavelength accelerates the photochemical reaction on the electrode surfaces, contributing to the formation of a very unique photocatalyst material film. Also, as an additional effect of this discharge, large quantities of highly oxidative ozone molecules, activated oxygen, oxygen atoms, and activated nitrogen substances are produced in the discharge space, and the interaction of these produced active gas and discharge light serves to form a photocatalyst material more efficiently.

FIG. 8 shows the field strength E/n characteristic with respect to a value acquired by converting the characteristic of FIG. 7 to the product of the gas pressure P and the gap length dg.

In the drawing, (P+0.1)*dg is the value of product with the gap length dg, using the vacuum state as a reference.

In short, if the discharge keeping voltage Vj and the field strength E/n characteristic is expressed by the (P+0.1)*dg value, one characteristic is provided.

As the (P+0.1)*dg value increases, E/n decreases and the discharge keeping voltage Vj rises.

From this drawing, it is found that the value is 0.14 (MPa*mm) or less in the zone where the field strength E/n is 120 Td or more. It is also found that if the discharge keeping voltage Vj is set at 3500 V or higher when designing the apparatus of this invention, an AC voltage of 7000 V or higher is necessary for providing sufficient power to the apparatus and therefore various problems occur such as significant increase in the size of the apparatus. Thus, it is found desirable that if the conditions are limited to the field strength E/n of 120 Td or more and the discharge keeping voltage Vj of 3500 V or less, the (P+0.1)*dg value is 0.1 (MPa*mm) or less.

FIG. 9 shows an example of ozone concentration characteristic with respect to discharge power at a discharge gap length of 0.1 mm. That is, as the gap length of the dielectric barrier discharge is reduced, the concentration of ozone or oxygen atoms is increased and the discharge energy injected into the very small surfaces increases. The thickness of the formed photocatalyst film becomes larger because of the photochemical reaction by the high-field discharge of the dielectric barrier discharge.

As described above, it is found that a very unique photocatalyst material film can be formed as the following three elements satisfy each other, as shown in FIG. 6, for providing a photocatalyst material of good quality:

1) intermittent injection of high energy to the very small surfaces by the dielectric barrier discharge;

2) increase in the oxidation ability (nitriding ability) by high-concentration ozone (NOx) and oxygen atoms (nitrogen atoms); and 3) cooling function to quickly cool the materials to be processed.

As a method and apparatus that satisfy these conditions to the maximum, the photocatalyst producing method and apparatus have been developed.

FIG. 10 shows the discharge keeping voltage Vj characteristic and the field strength E/n characteristic in the case of varying the power output frequency at which an AC voltage applied to this apparatus is supplied, under the conditions of gas pressure P of 0.25 MPa and discharge gap length dg of 0.1 mm, as an example of this invention.

In FIG. 10, when the power output frequency is increased, the discharge keeping voltage Vj tends to be lowered near a frequency over approximately 20 kHz, and also the field strength E/n tends to be lowered with respect to the frequency.

As the frequency becomes higher than a predetermined frequency, the lowering tendency of the discharge keeping voltage Vj and the field strength E/n is considered to mean that residual electric charges remain in the discharge space and that high field strength E/n cannot be provided because of the residual electric charges.

The residual electric charges are less dependent on the gap length and gas pressure. As the power frequency becomes higher, the dielectric barrier discharge, which still provides intermittent plasma, is lowered, gradually approaching to the field strength E/n of continuous plasma.

Therefore, in order to provide the high field E/n value of 120 Td or more, the power frequency must be limited to a predetermined frequency or less. In this apparatus, it is found desirable that the frequency is 30 kHz or less.

If the discharge gap d is shortened to approximately 0.1 mm, the discharge field strength is increased and consequently discharge light of high luminance having high energy is provided. The photocatalyst producing ability is enhanced and a thick film can be provided.

In our experiment, as the gap (discharge gap) is shortened, the field strength of the dielectric barrier discharge is increased and the light intensity of the discharge light having a light wavelength within the range of 428 nm to 620 nm by the discharge is increased. High-concentration ozone gas is produced and the speed at which the metal or metal compound contacting the discharge space is modified to a photocatalyst material is accelerated. As a result, a photocatalyst material of good quality is provided. Also, our experiment has confirmed that a photocatalyst material can be sufficiently produced at the discharge gap of 0.6 mm or less.

It is also confirmed from the experiment that as the gap exceeds approximately 0.6 mm, the light intensity of the silent discharge light is extremely lowered, thus reducing the dissociation of oxygen gas, making the provision of high-concentration ozone and oxygen atoms difficult, weakening the quick heating and quick cooling effect, and consequently making the provision of an amorphous photocatalyst material of good quality difficult or showing the tendency to take a very long time to form a film.

Meanwhile, in the production of ozone by a photocatalyst material, it is found that as the high-luminance discharge light of the dielectric barrier is cast onto the photocatalyst material, the photocatalyst material absorbs the discharge light energy and is thus excited, enabling the dissociation of oxygen by the adsorption and dissociation effect of the excited photocatalyst and oxygen gas. Moreover, it is found that ozone can be produced by the action of accelerating the coupling effect based on three-party collision of the dissociated oxygen atom and oxygen molecule.

Here, the relation between the band gap energy {energy gap E (eV)} of the photocatalyst and the wavelength λ (nm) of the absorbed light is shown as follows:

| wavelength λ (nm) of absorbed light ≦1240/E (eV) | |
|---|---|
| Energy gap E (eV) | Wavelength of absorbed light (nm) |
| 3.6 | 344 |
| 3.5 | 354 |
| 3.4 | 365 |
| 3.3 | 376 |
| 3.2 | 388 |
| 3.1 | 400 |
| 3.0 | 413 |
| 2.9 | 428 |
| 2.8 | 443 |
| 2.7 | 459 |
| 2.6 | 477 |
| 2.5 | 496 |
| 2.4 | 517 |
| 2.3 | 539 |
| 2.2 | 564 |
| 2.1 | 590 |
| 2.0 | 620 |

As seen from the above description, in the photocatalyst material producing method and apparatus of this invention, if a metal atom to be a photocatalyst material is selected and a metal or compound having the metal atom to be the photocatalyst material is applied to the electrode surface, which is the discharge surface, and the dielectric material surface, dielectric barrier discharge and ozone, oxygen atoms and the like cause oxidation, thus forming an oxide film of good quality and forming the photocatalyst material. Also, if nitrogen gas is used, the nitriding reaction can accelerated by NOx and nitrogen atoms, thus realizing the effect of the photocatalyst material with respect to visible rays and realizing the unique photocatalyst material having very high photocatalytic effect.

The impurity and organic substance of the applied metal or compound react with ozone and oxygen atoms and are gasified into vapor (H2O), CO2, HNO3, methane or the like. Thus, the impurity is eliminated and the photocatalyst of good quality is formed is formed on the discharge surface.

Typical metal atoms to be photocatalyst materials include Cu, In, Fe, Ti, Cr, Pb, V, W, Bi, Zn, Nb, Ta, Ba, Mn, Sr and the like, which provide amorphous materials such as $CuO_2$, $In_2O_3$, $Fe_2TiO_3$, $Fe_2O_3$, $Cr_2O_3$, PbO, $V_2O_5$, $FeTiO_3$, $WO_3$, $Bi_2O_3$ and ZnO as photocatalyst materials by dielectric barrier discharge.

If the photocatalyst material of the above-described metal oxides is doped with an elements to be an auxiliary catalyst such as Ru, Ni, Pt, $RuO_2$, NiOx or NiO, the excitation ability of the photocatalyst is further accelerated and the life increase (accumulation) effect of holes is enhanced, thus providing a photocatalyst material of better performance.

Embodiment 2

FIG. 2 is a structural block diagram for explaining a photocatalyst material producing method and apparatus according to Embodiment 2. In Embodiment 2, except for the construction parts and method specific to the following description, construction parts and method similar to the construction parts and method in the foregoing Embodiment 1 are provided and have the same effects.

In Embodiment 1, the mechanism and construction for producing a photocatalyst material film with respect to the surface of the electrode 1 or the surface of the dielectric material 3, which is the discharge surface of dielectric barrier discharge are mainly described. However, in Embodiment 2, metal powder, metal compound vapor or the like that can be a photocatalyst is mixed with oxidation gas to be supplied, and the gas is supplied to a dielectric barrier discharge unit, thereby modifying the metal powder or metal compound vapor to a photocatalyst material.

In FIG. 2, metal powder or metal compound vapor 12 to be a photocatalyst material from a metal powder or metal compound supply box 11 is mixed with oxygen gas 10 by a mixer 82, and the mixture is supplied to a dielectric barrier discharge gap 4. Gas 13 containing a photocatalyst material is taken out together with oxygen gas, and this gas 13 is processed by a photocatalyst/gas separator 14, thus taking out a photocatalyst material 50. The gas processed by the photocatalyst/gas separator 14 is processed by a gas decomposition processor 15. The other parts of the construction are equivalent to those of Embodiment 1 shown in FIG. 1.

In this apparatus construction, to allow a long contact time of the dielectric barrier discharge and the gas, the discharge gap 4 is constructed in the form of a narrow tube, thus allowing a long discharge length and improving the production efficiency and quality of the photocatalyst material.

In the gas system in Embodiment 2, dilute gas 10A to be auxiliary starting material gas supplied via an auxiliary gas cylinder 8A and a gas regulator 83 may be contained in oxygen gas, as shown in FIG. 3, and the production efficiency of the photocatalyst material can be improved further.

Embodiment 3

FIG. 11 is a structural block diagram showing a photocatalyst material producing method and apparatus of multilayer discharge cell type according to Embodiment 3. In Embodiment 3, except for the construction parts and method specific to the following description, construction parts and method similar to the construction parts and method in the foregoing Embodiment 1 are provided and have the same effects.

In this Embodiment 3, plural electrode cells (for example, N-1 to N-8) are stacked and dielectric barrier discharge is evenly generated in discharge gaps 4 provided in parallel in the respective cells, thereby enabling production of photocatalyst material films on plural electrode surface and dielectric surfaces at a time.

In FIG. 11, a base 600 for stacking discharge cells thereon and a chamber 700 form a gas space, and oxygen gas is supplied from an oxygen gas inlet 89, thereby filling the gas space with oxygen gas. Also, flat plate-like low-voltage electrode 1, insulating board, high-voltage electrode 2, dielectric material 3, discharge gap, low-voltage electrode 1, discharge gap, dielectric material 3, high-voltage electrode 2 and insulating board are stacked in this order on the base 600, thereby forming a discharge cell group 702 of a pair of discharge cells having two discharge gaps. The discharge cell groups 702 are stacked in plural stages, thus constituting an electrode multilayer module 701.

Moreover, to cool each discharge cell group, a structure to allow cooling water to flow on the inner surface of the electrode is provided, and in each cell, in order to exhaust the processed gas processed by dielectric barrier discharge, the processed gas is allowed to enter the inner surface of the electrode from the central part of the inner surface of the electrode, then be taken out from the side and taken out from a gas outlet 139 of the apparatus. The cooling water enters from a cooling water outlet/inlet 189 of the apparatus, is then distributed to each low-voltage electrode, and cools the electrode surface. The water, which has cooled the electrode surface, merges at the electrode side and is taken out from another cooling water outlet/inlet 189 (not shown) of the apparatus.

As the photocatalyst material producing apparatus is constructed as described above, plural photocatalyst material films can be formed at a time, having an effect that the production cost of the photocatalyst material films can be significantly lowered. Also, since the gas processed by dielectric barrier discharge is continuously exhausted, impurity gas generated by the discharge can be constantly eliminated to form an amorphous oxide film having high purity for the photocatalyst material film. As a result, there is an effect that a photocatalyst material film of good quality is provided.

Embodiment 4

FIG. 12 is a structural block diagram for explaining a photocatalyst material producing method and apparatus according to Embodiment 4. In Embodiment 4, except for the construction parts and method specific to the following description, construction parts and method similar to the construction parts and method in the foregoing Embodiment 1 are provided and have the same effects.

In FIG. 12, a flow rate controller 84 that controls the quantity of supply of oxidation gas, and a pressure controller 132 for controlling the gas pressure within the apparatus are provided. In a photocatalyst producing condition controller 16 that controls the photocatalyst producing conditions, a predetermined quantity Q of supply of oxidation gas and a predetermined gas pressure value are controlled by the flow rate controller 84 and the pressure controller 132, then the inverter 902 within the power source is instructed with respect to power to be injected into dielectric barrier discharge, and the outlet temperature T of the cooling water that cools the electrode is detected, thereby controlling the average electrode temperature in the apparatus.

As the gas pressure becomes higher, the diameter of one discharge pole of the dielectric barrier discharge shown in FIG. 5 can be miniaturized. If the gas pressure value in the apparatus is controlled, the power density to be injected to the discharge surface can be controlled. Moreover, if the electric input of the dielectric barrier discharge is controlled by the inverter, the average electric quantity injected into single dielectric barrier discharge can be immediately controlled, and if the outlet temperature T of the cooling water is detected and the electric quantity of the inverter 902 is feedback-controlled to achieve a predetermined average electrode temperature, the producing conditions for the photocatalyst material can be precisely controlled.

Employing such a control system has effects that a photocatalyst material of higher quality can be produced and that the photocatalyst material can be formed more speedily and efficiently.

Embodiment 5

FIG. 13 is structural block diagram for explaining a photocatalyst material producing method and apparatus according to Embodiment 5, in which a third starting material gas 10B other than the oxidation and nitriding gases is supplied to the photocatalyst material producing unit 7 via an auxiliary gas cylinder 8B and gas regulator 81B, and a flow rate controller 84B. In Embodiment 5, except for the construction parts and method specific to the following description, construction parts and method similar to the construction parts and method in the foregoing Embodiment 1 are provided and have the same effects.

As the third starting material gas, dilute gas of helium, argon or like gas, which is inert gas for annealing the produced photocatalyst material, is supplied, or alternatively, a compound gas of an auxiliary catalyst material such as Ru, Ni, Pt, $RuO_2$, NiOx, or NiO for improving the performance of the photocatalyst material is supplied in order to dope with the auxiliary catalyst material by discharge. As the dilute gas is supplied as the third starting material gas, the oxidation and nitriding gases in the apparatus in which a photocatalyst material film is produced by dielectric barrier discharge is replaced by the dilute gas, and discharge is caused by small injection power from the power source in the low gas pressure state within the apparatus, thus gradually heating and annealing the photocatalyst material film by low-density discharge with the inert gas.

Also, as the compound gas containing the auxiliary catalyst material is supplied to cause dielectric barrier discharge, the produced photocatalyst material film can be doped with the auxiliary catalyst material ions decomposed by the discharge.

In this manner, by supplying the third starting material gas to anneal the photocatalyst film surface or dope the auxiliary photocatalyst film, the excitation ability of the photocatalyst by light irradiation is enhanced and the life elongation (accumulation) effect of holes is increased. Thus, the performance and quality of the produced photocatalyst material are improved.

Embodiment 6

FIG. 14 is a structural block diagram for explaining a photocatalyst material producing method and apparatus according to Embodiment 6. In Embodiment 6, except for the construction parts and method specific to the following description, construction parts and method similar to the construction parts and method in the foregoing Embodiment 1 are provided and have the same effects.

In Embodiment 6, an ozonizer 710 is provided in the line 10 that supplies oxygen from the oxygen cylinder 8, and the gas that is once transformed to high-concentration ozonized oxygen gas 101 by the ozonizer is supplied to the photocatalyst material producing apparatus.

In this manner, as the ozonizer 701 is provided before the photocatalyst material producing unit 7 and ozone gas is supplied from outside, the reaction for producing the photocatalyst material is accelerated not only by the ozone produced by the photocatalyst material producing unit 7 but also by the additionally supplied high-concentration ozone gas and dielectric barrier discharge. Thus, even a photocatalyst material having a band gap of 2 eV or less and a photocatalyst material having a band gap of 3 eV or more, on which ozone is cannot be easily produced, can be modified to photocatalyst materials of good quality.

As described above, in the photocatalyst material producing method and apparatus of this invention, in an electrode space at a high pressure of 1 atm. or higher in which oxidative gas such as oxygen gas or ozone gas, or nitrogen gas is supplied, high-field plasma is realized by dielectric barrier discharge (silent discharge) of intermittent plasma at a short electrode gap length of 0.6 mm or less. Also, a metal or the like in the crystal state is oxidized or nitrided utilizing the features of the dielectric barrier discharge by very reactive oxidation ability due to activated oxygen of oxygen atoms and ozone, or activated nitrogen substance such as nitrogen atoms and NOx, thereby transforming the metal to an insulating material. Also, quick heating and quick cooling is realized on a very small discharge surface by the heat of dielectric barrier discharge, thus modifying the material to an amorphous material. In view of physics, it is no exaggeration to say that this provided photocatalyst material is an amorphous insulating material and is a semiconductor material having a large band gap. In short, it can be said that, as a solid material, the photocatalyst material provided by the method and apparatus of this invention is an amorphous photocatalyst material and an amorphous semiconductor. Since there is no distinction or boundary between this photocatalyst material and an amorphous semiconductor, it can be said that these materials are of the same group.

Here, the photocatalyst material producing apparatus and the photocatalyst material producing method utilizing dielectric barrier discharge (silent discharge) that can generate high-field intermittent discharge plasma as the discharge are described. However, so-called "creeping discharge" that is via a dielectric material has the similar effects. In short, this invention is realized by high-field intermittent discharge plasma, and "creeping discharge", too, utilizes AC discharge via a dielectric material. The only difference between dielectric barrier discharge (silent discharge) and "creeping discharge" is whether a discharge pole generated in gas or gas discharge along the surface of a material (creeping) is used. The discharge mechanism of "creeping discharge" is the mechanism of dielectric barrier discharge itself. It is confirmed that "creeping discharge" is the discharge belonging to dielectric barrier discharge.

INDUSTRIAL APPLICABILITY

This invention is suitable for application to a photocatalyst material producing apparatus and a photocatalyst material producing method. The invention realizes high-field plasma by dielectric barrier discharge (silent discharge or creeping discharge) of intermittent plasma at a short electrode gap length of 0.6 mm or less in an electrode space at a high pressure of 1 atm. or higher in which oxidative gas such as oxygen gas or ozone gas, or nitrogen gas is supplied. Also, the invention can not only form an oxide of good quality but also form a nitride film and powder particles of good quality by very reactive oxidation ability due to activated oxygen of oxygen atoms and ozone, or activated nitrogen substance such as nitrogen atoms and NOx. The invention is suitable for providing a very hard amorphous nitride material and is also suitable as means for providing not only a photocatalyst material but also an amorphous semiconductor material.

BRIEF DESCRIPTION OF THE DRAWINGS

FIG. 15 is a view showing an example of energy gap of various photocatalyst materials and absorption wavelength of photocatalytic effect.

DESCRIPTION OF REFERENCE NUMERALS AND SIGNS

Figure 1:
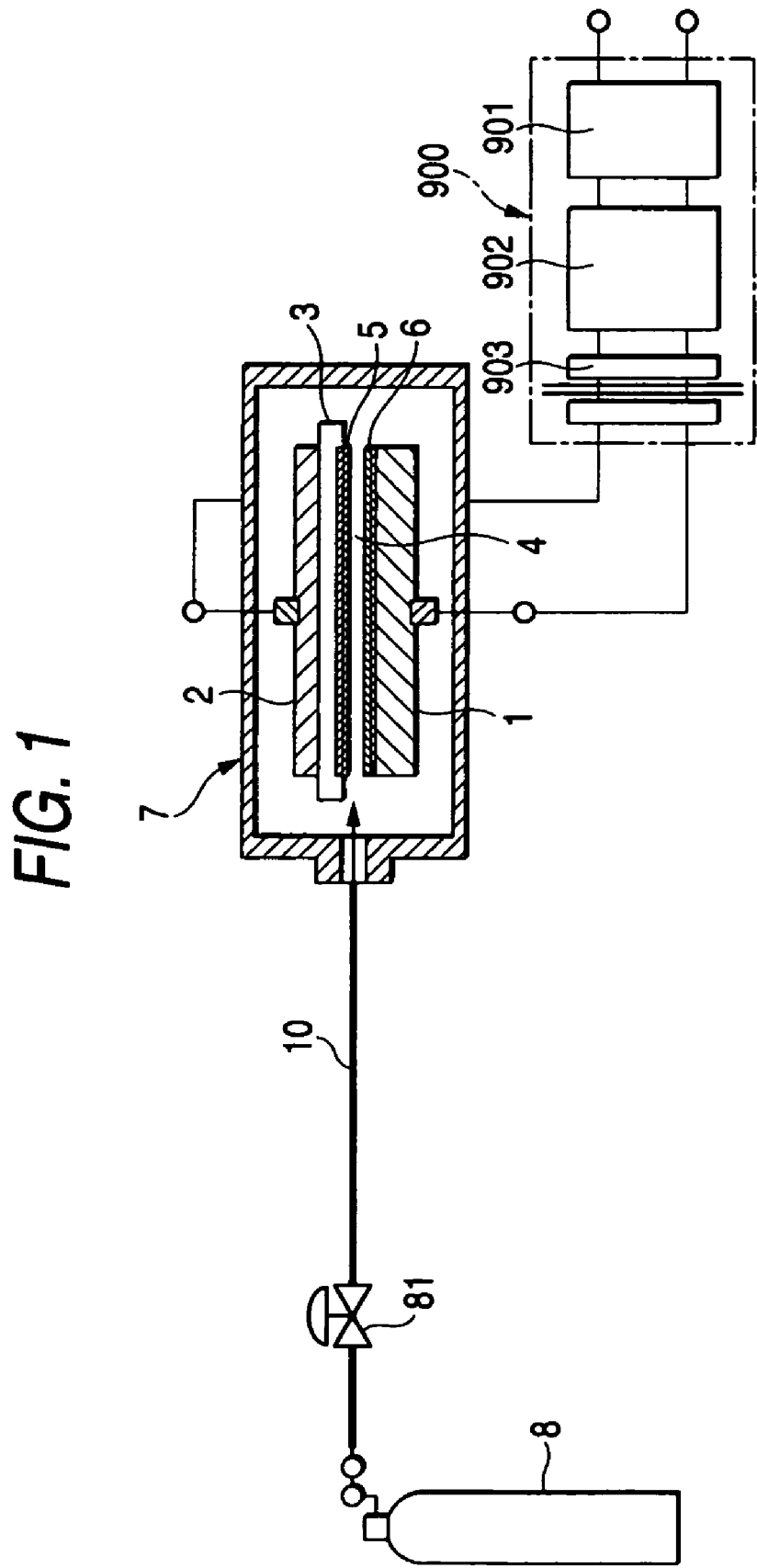
FIG. 1 is a structural block diagram for explaining a photocatalyst material producing method and apparatus according to Embodiment 1 of this invention.
Figure 2:
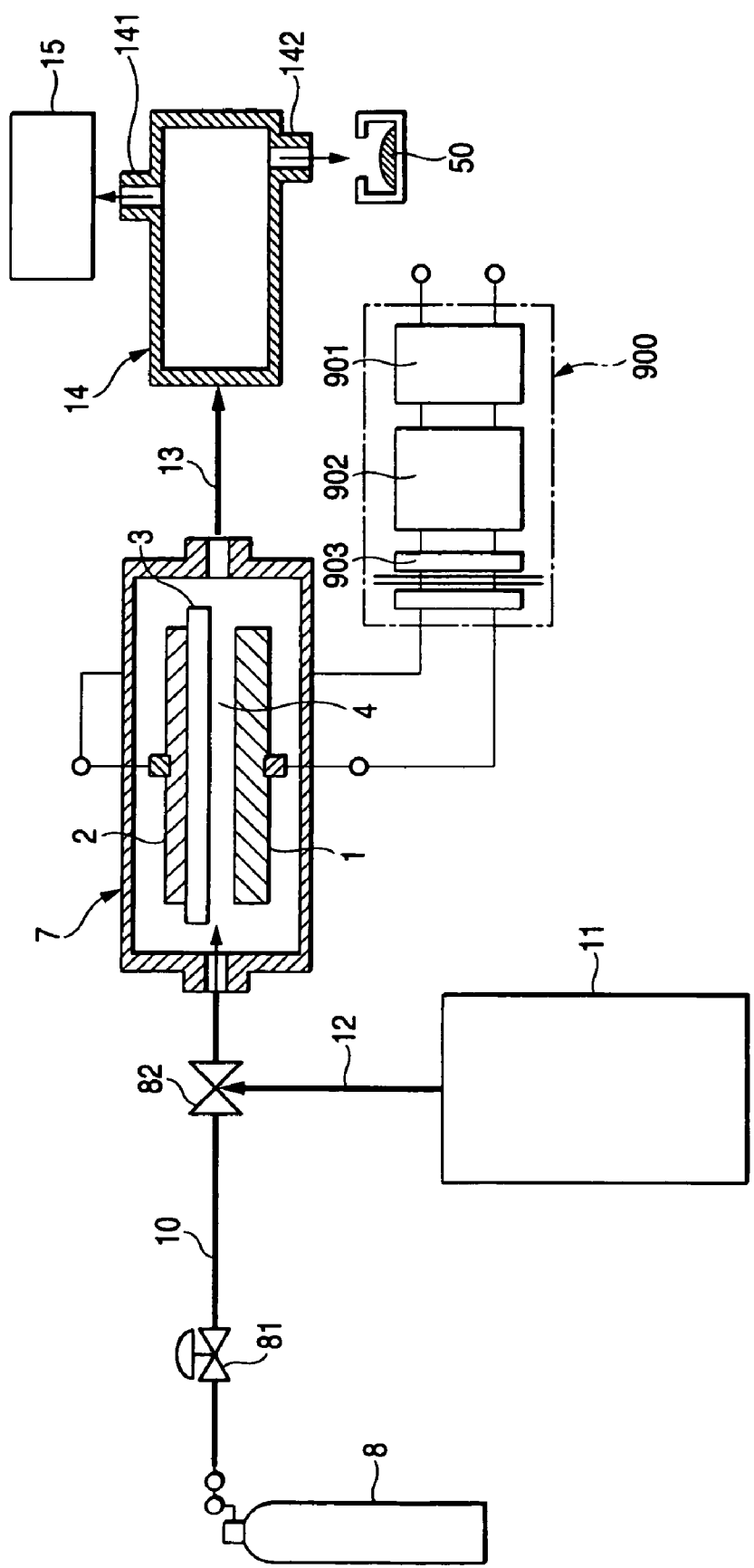
FIG. 2 is a structural block diagram for explaining a photocatalyst material producing method and apparatus according to Embodiment 2.
Figure 3:
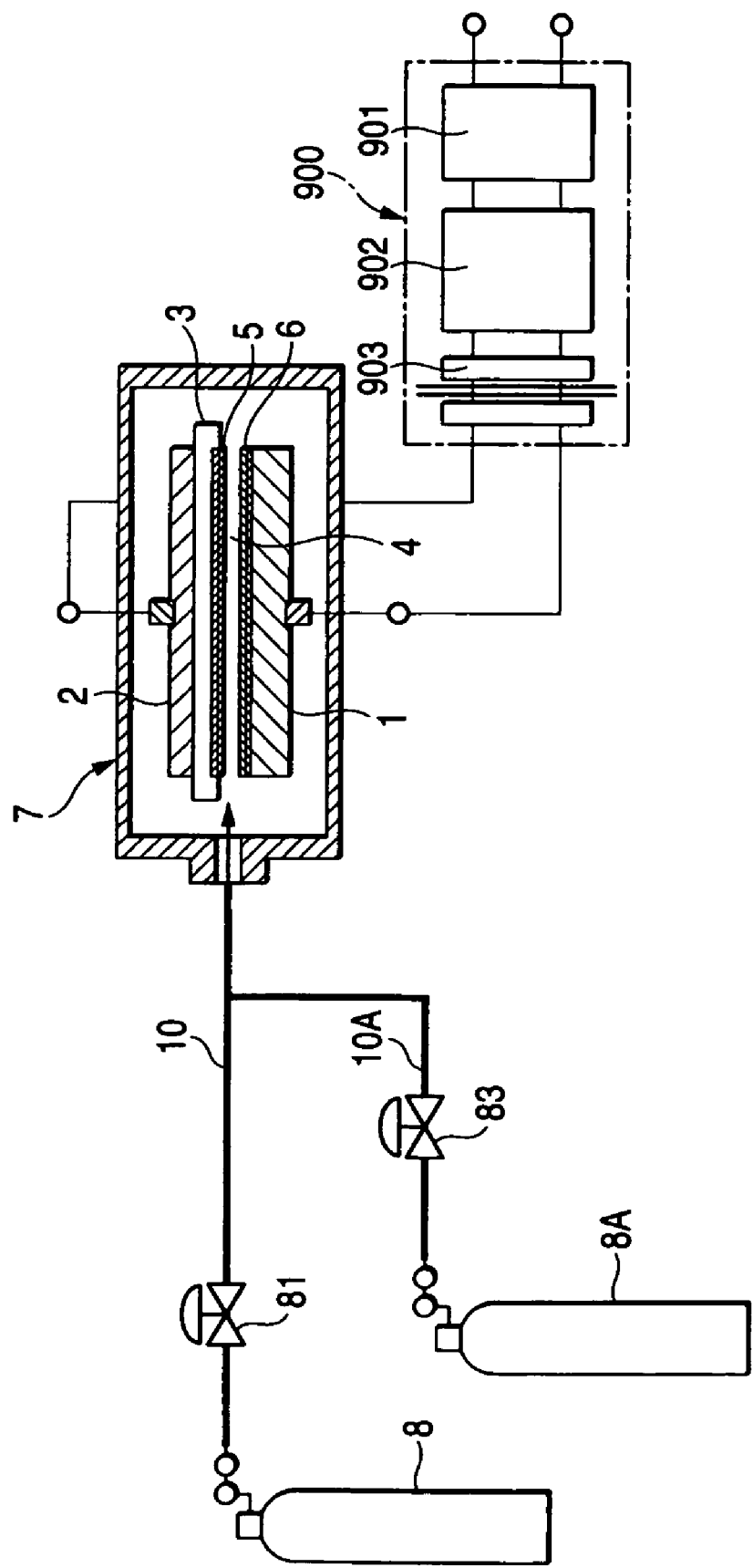
FIG. 3 is a structural block diagram showing a case of using an auxiliary starting material gas in Embodiments 1 and 2.
Figure 4:
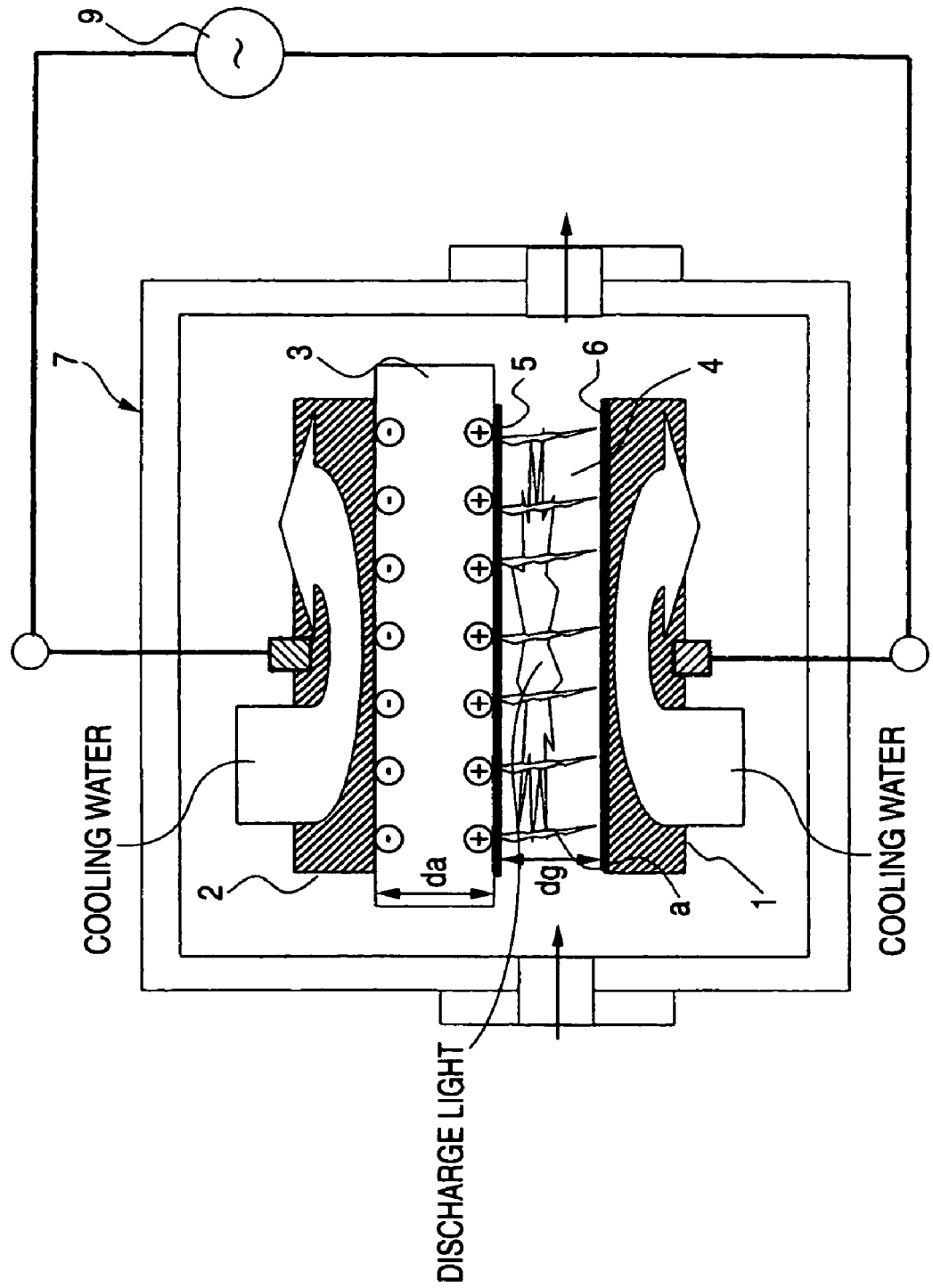
FIG. 4 is a diagram showing a discharge mode of dielectric barrier discharge in Embodiments 1 and 2.
Figure 5:
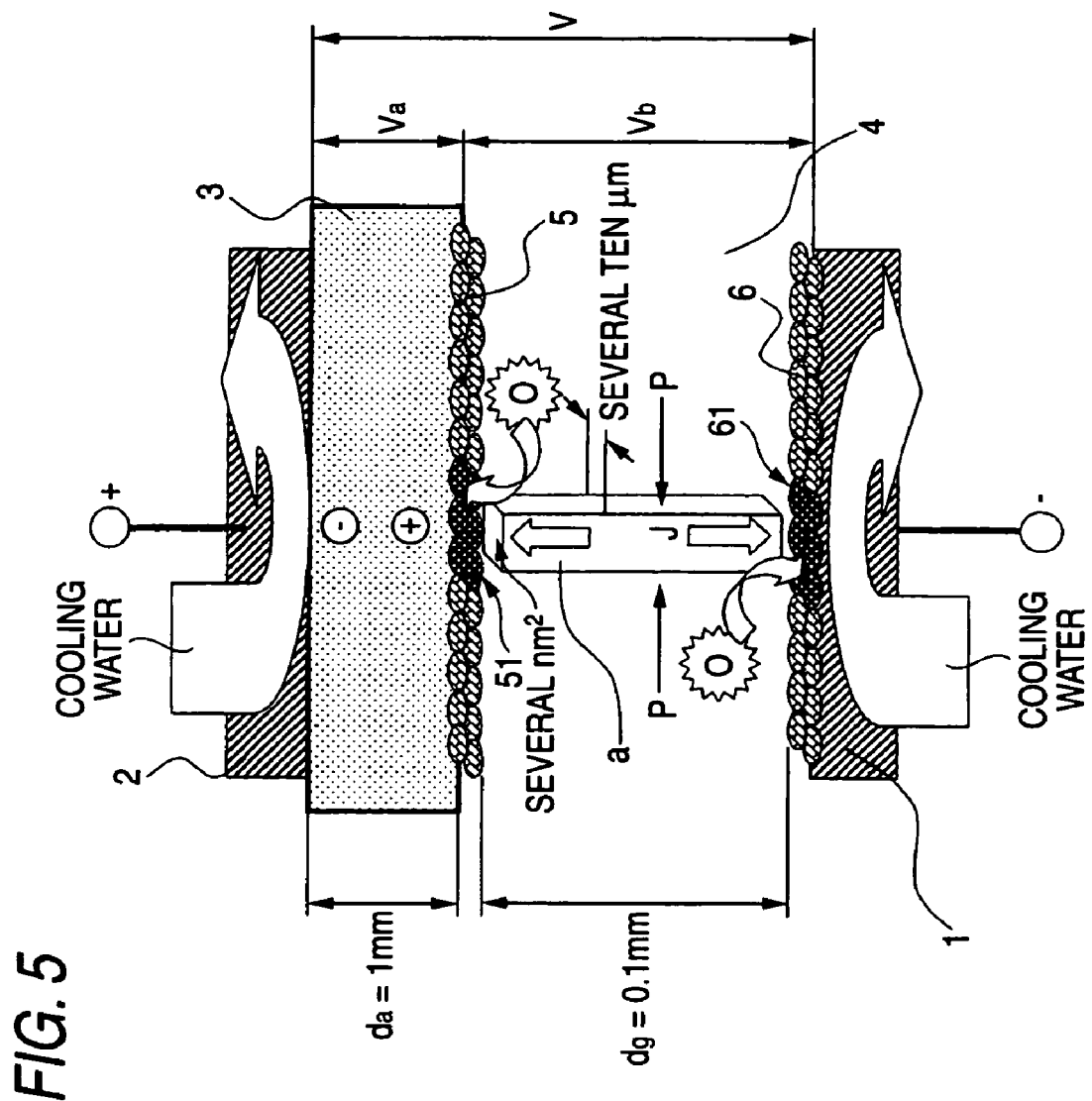
FIG. 5 is a diagram showing a mechanism of modifying a metal or metal compound material by oxygen containing ozone and high-field plasma in Embodiment 1.
Figure 6:
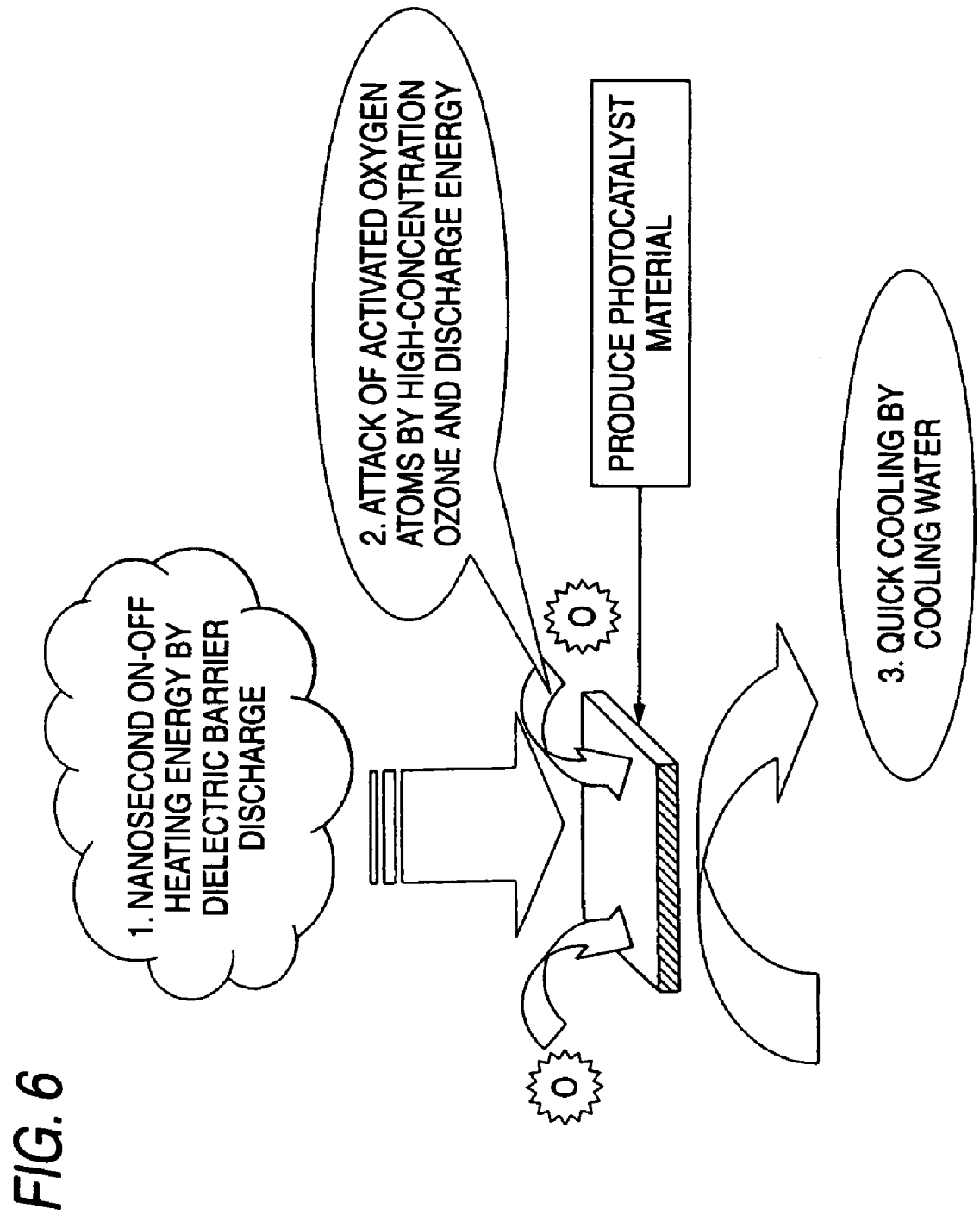
FIG. 6 is another diagram showing a mechanism of modifying a metal or metal compound material by oxygen containing ozone and high-field plasma in Embodiment 1.
Figure 7:
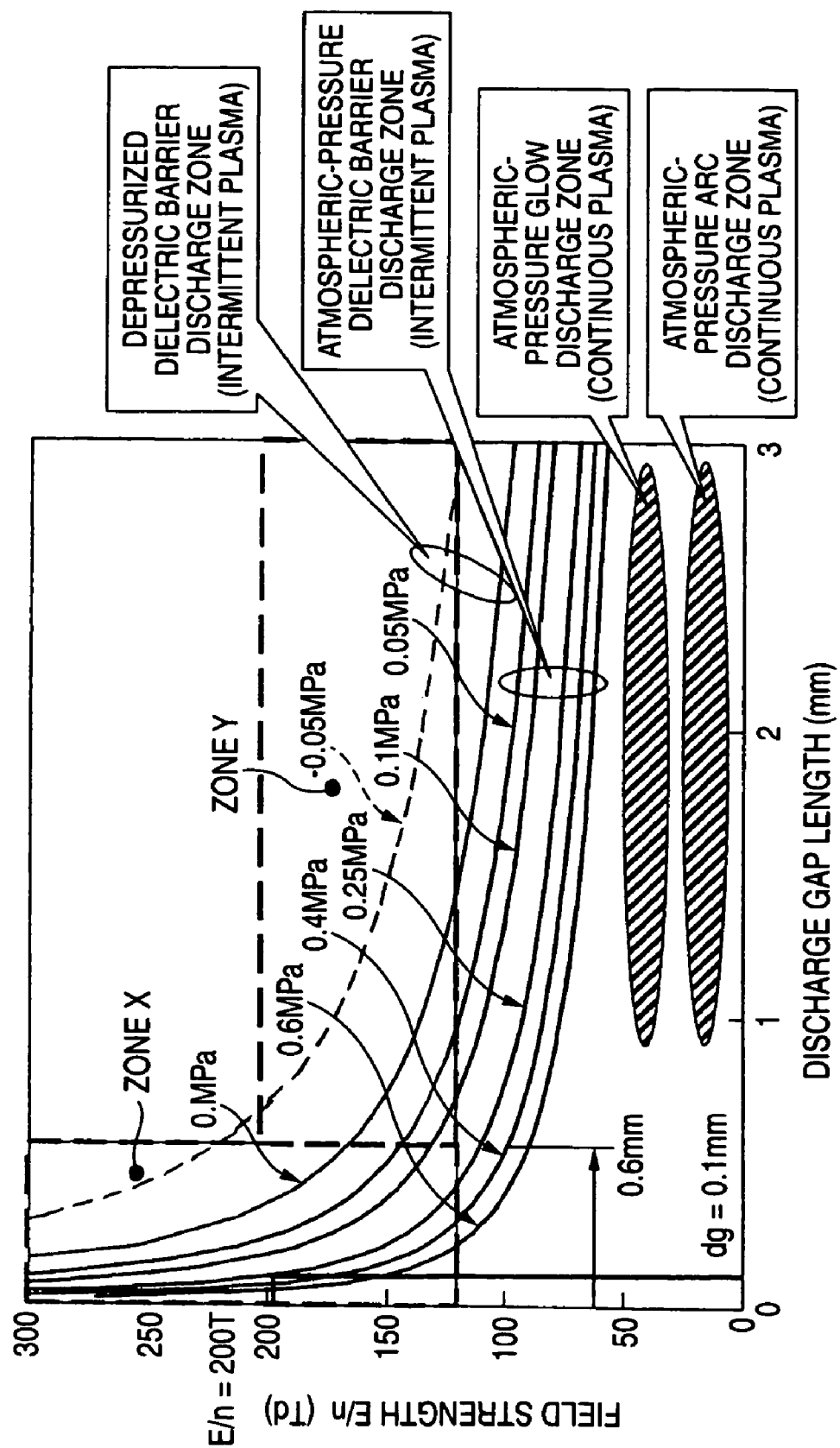
FIG. 7 is a view showing the field strength E/n and characteristics of discharge plasma depending on the discharge mode of dielectric barrier discharge, atmospheric glow discharge or atmospheric arc discharge, and the gap length, in Embodiments 1 and 2.
Figure 8:
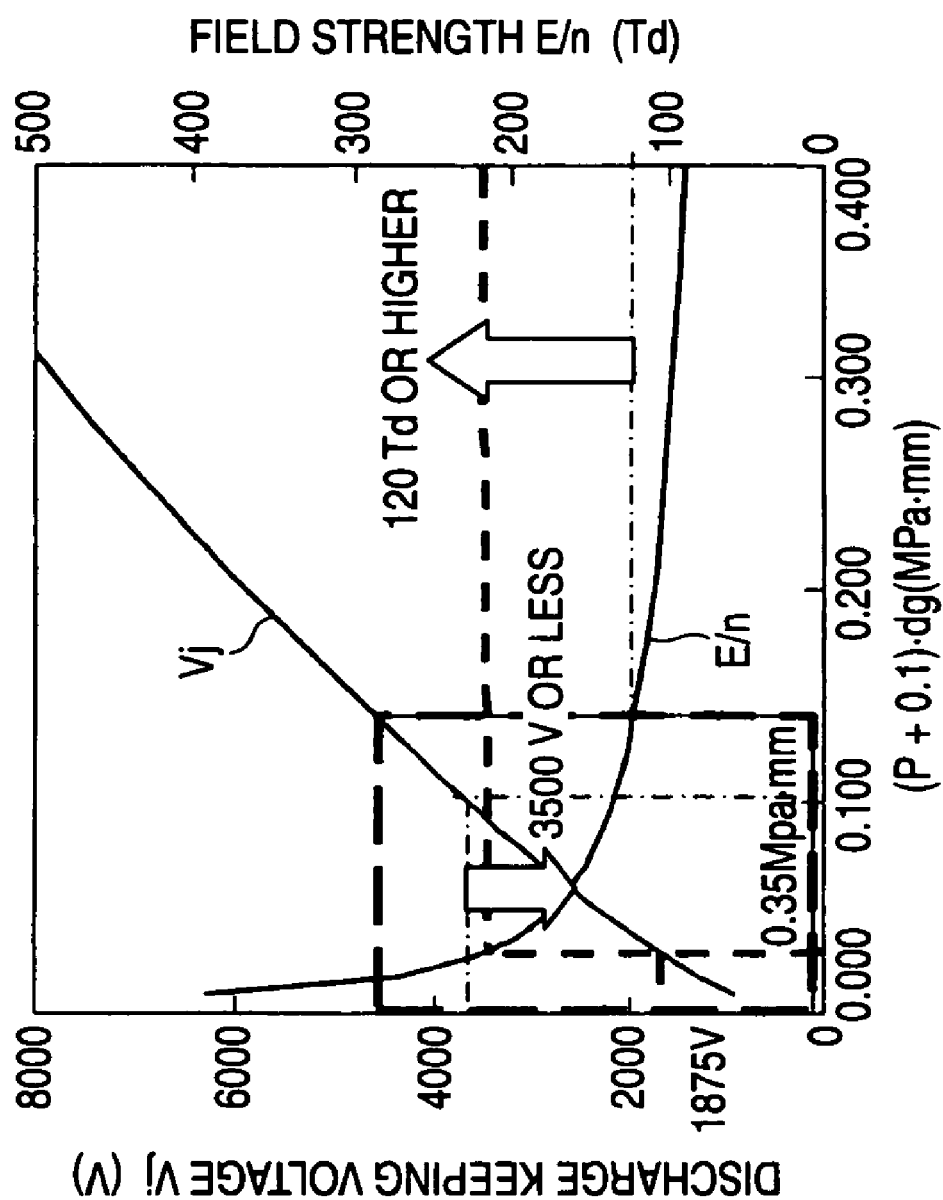
FIG. 8 is a view showing the discharge keeping voltage Vj, field strength E/n and characteristics of discharge plasma depending on the (P+0.1)*dg value, which is the product of the gas pressure P and the gap length dg of dielectric barrier discharge, in Embodiments 1 and 2.
Figure 9:
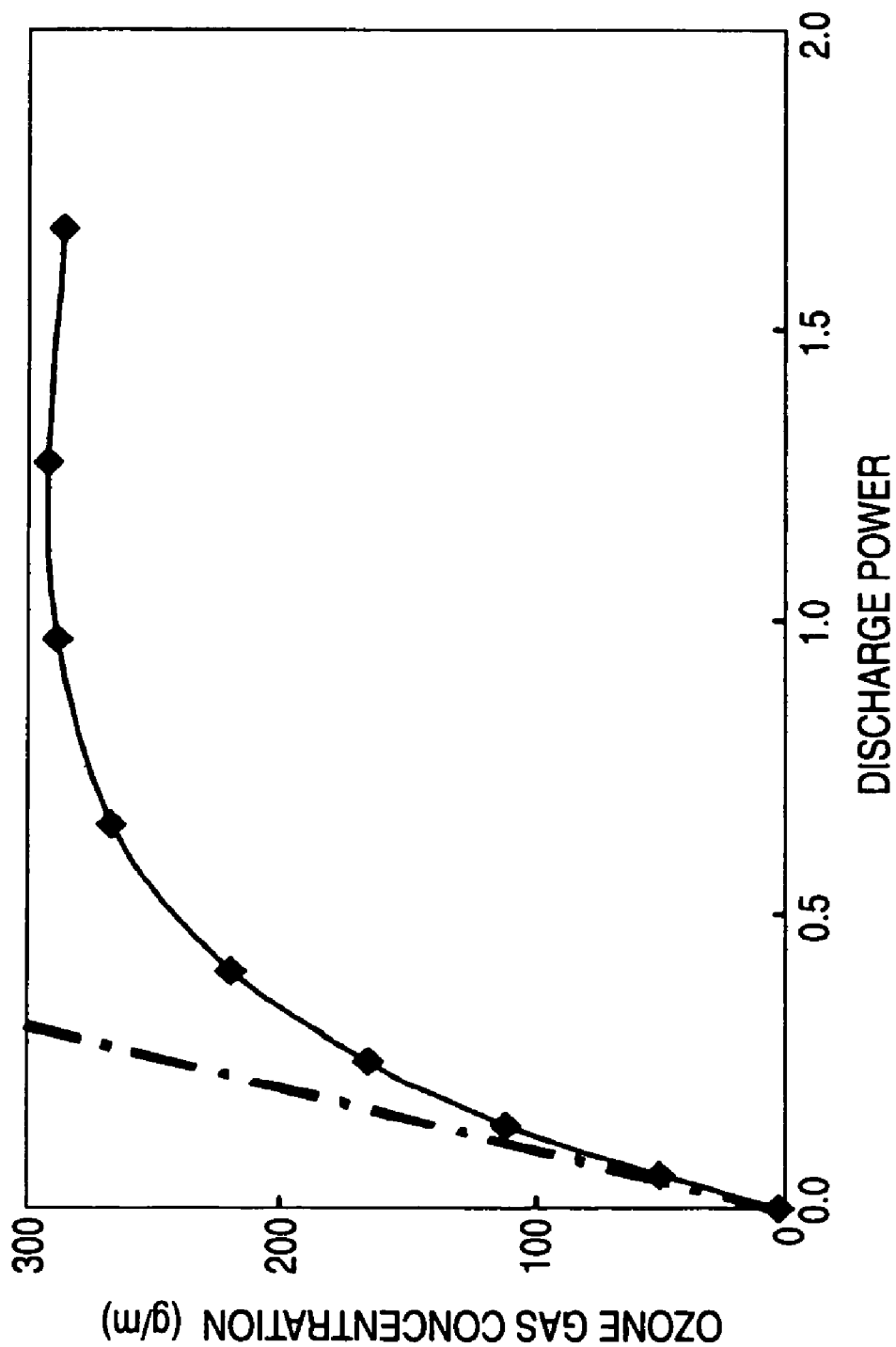
FIG. 9 is a view showing the ozone generation concentration characteristics by dielectric barrier discharge in Embodiments 1 and 2.
Figure 10:
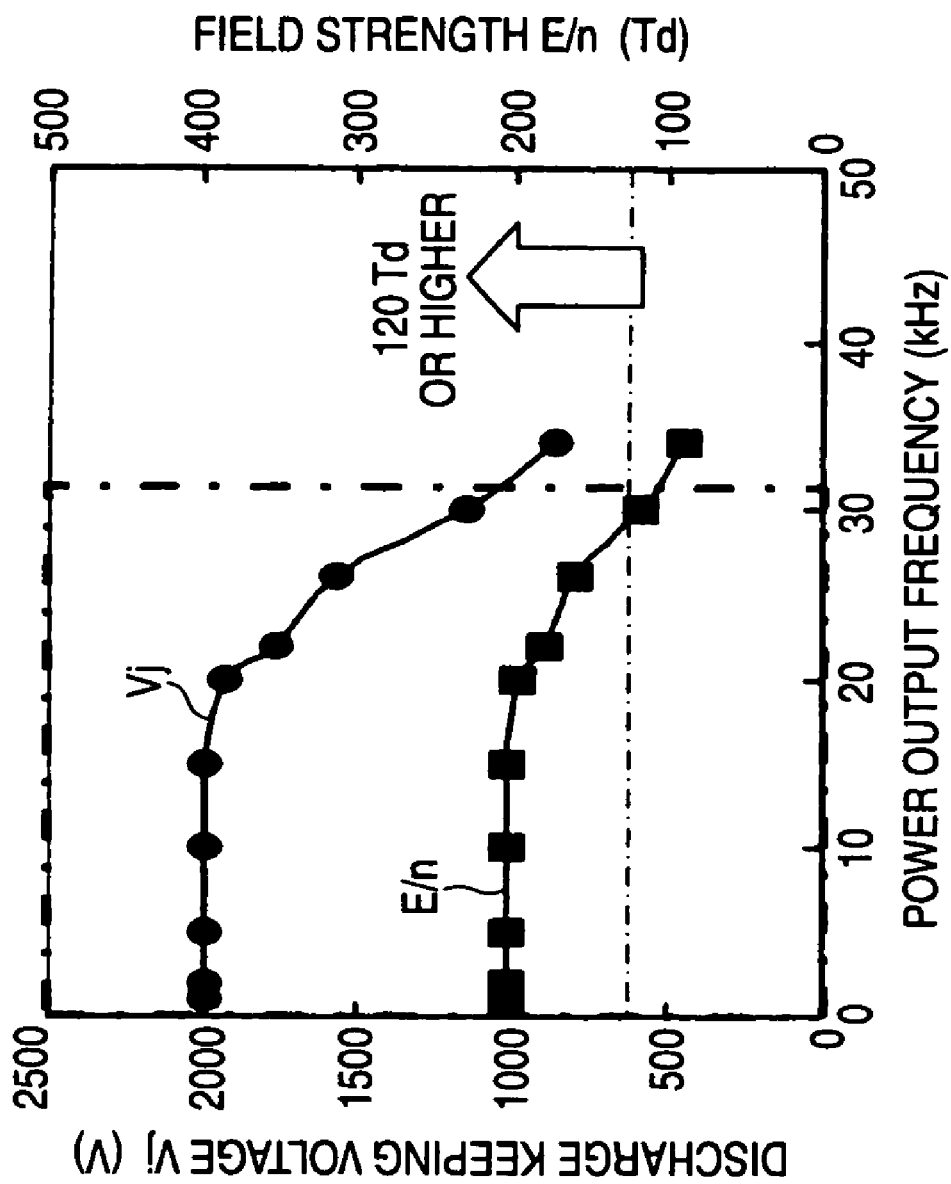
FIG. 10 is a view showing the discharge keeping voltage Vj, field strength E/n and characteristics of discharge plasma depending on the power output frequency of dielectric barrier discharge in Embodiments 1 and 2.
Figure 11:
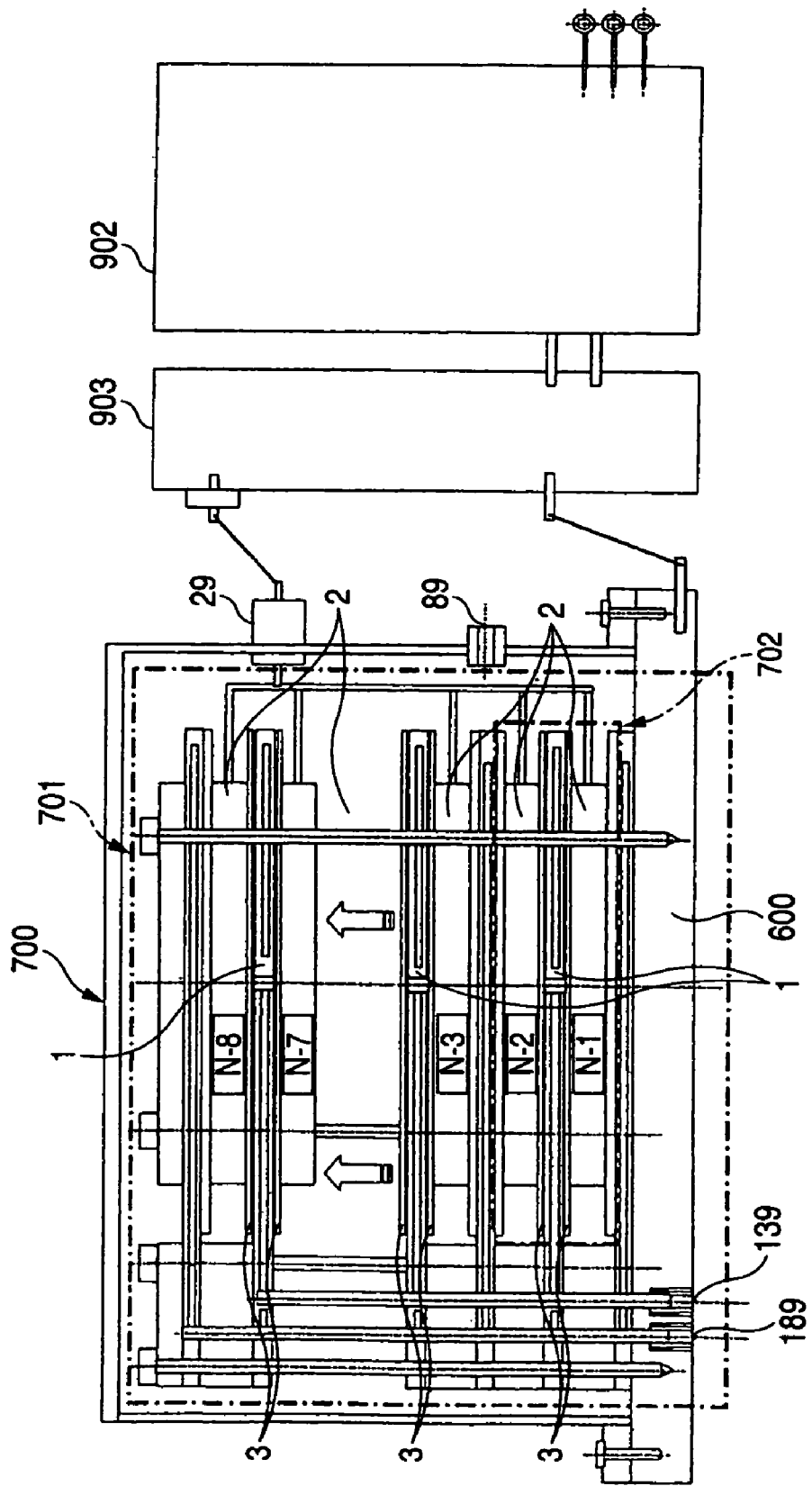
FIG. 11 is a structural block diagram for explaining a photocatalyst material producing method and apparatus according to Embodiment 3.
Figure 12:
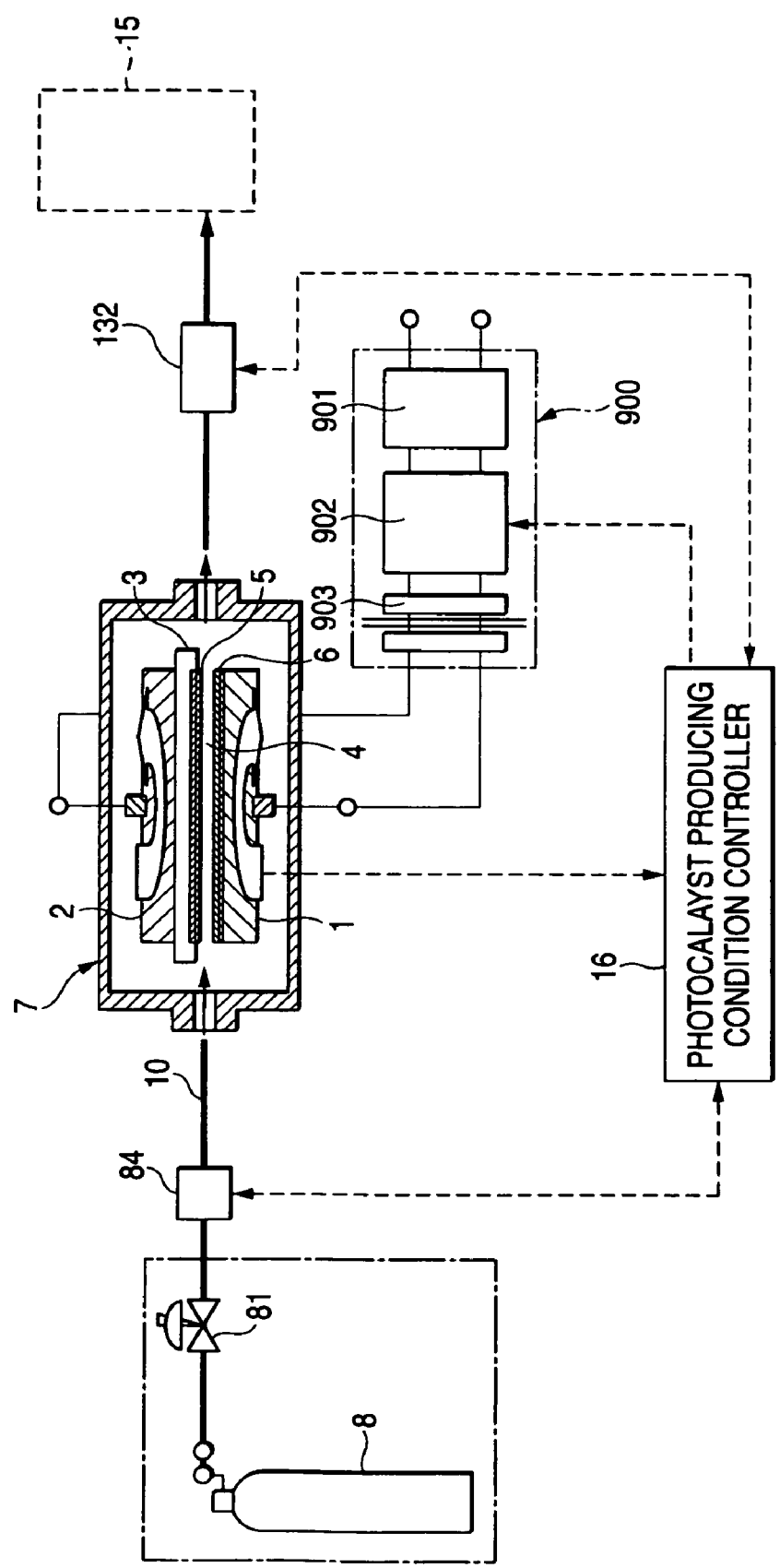
FIG. 12 is a structural block diagram for explaining a photocatalyst material producing method and apparatus according to Embodiment 4.
Figure 13:
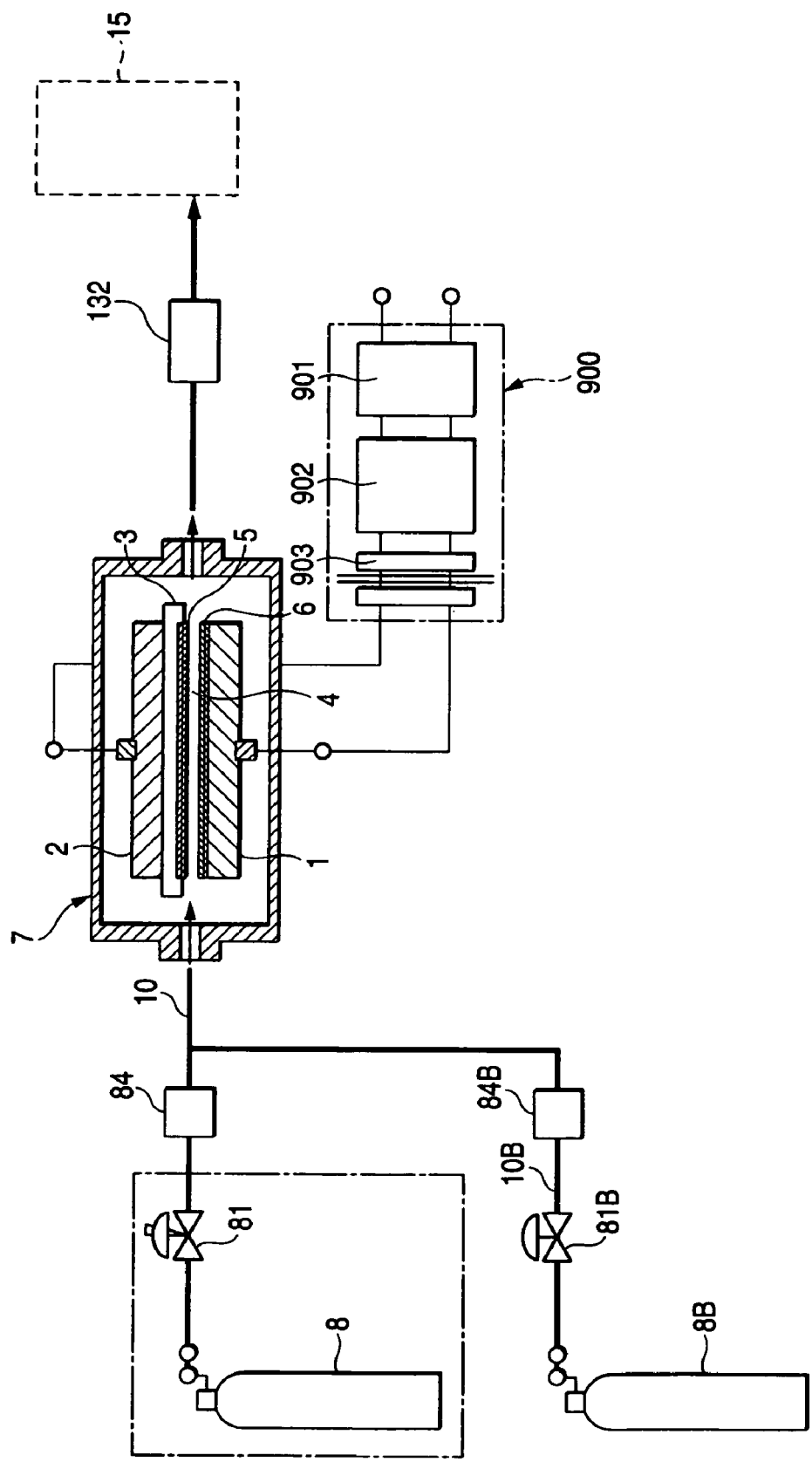
FIG. 13 is a structural block diagram for explaining a photocatalyst material producing method and apparatus according to Embodiment 5.
Figure 14:
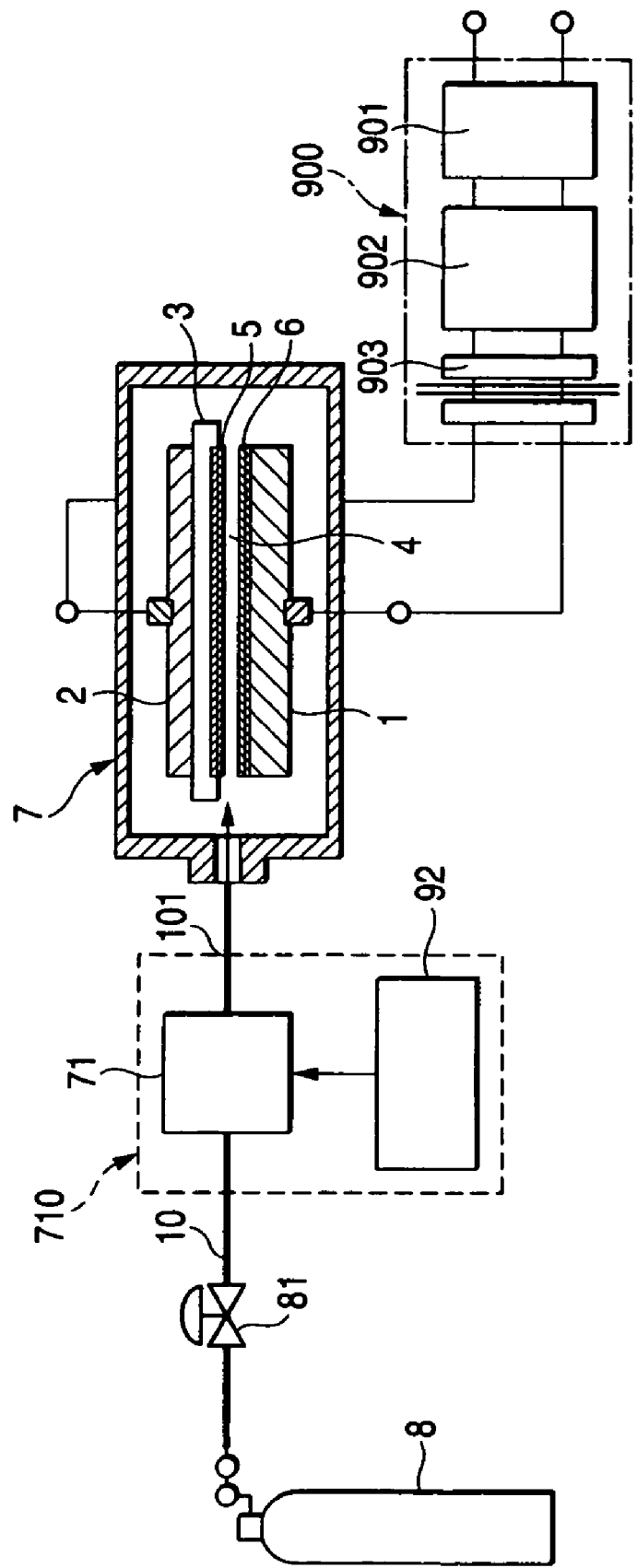
FIG. 14 is a structural block diagram for explaining a photocatalyst material producing method and apparatus according to Embodiment 6.

1 electrode (low-voltage electrode), 2 electrode (high-voltage electrode), 3 dielectric material, 4 discharge gap, 5, 6 metal or compound material, 7 photocatalyst material producing unit, 8 oxygen supply cylinder, 8A, 8B auxiliary gas cylinder, 10 oxygen gas, 10A auxiliary gas, 10B third starting material gas, 11 metal powder or metal compound supply box, 12 metal powder or metal compound, 13 photocatalyst material gas, 14 photocatalyst material/gas separator, 50 photocatalyst material, 600 base, 700 chamber, 701 electrode multilayer module, 702 discharge cell group, 900 AC power source, 901 converter part, 902 inverter part, 903 transformer part.

The invention claimed is:

1. A photocatalyst material producing method characterized by comprising forming a discharge zone with a discharge gap part defined therein by first and second electrodes facing each other and arranging a dielectric material on a surface of the first electrode facing to the second electrode, coating the second electrode or the surface of the dielectric material with a metal or metal compound to be a photocatalyst material, supplying oxygen gas containing ozone into the discharge gap part, applying an AC voltage between the first electrode and the second electrode to introduce AC power of a predetermined power density into the discharge zone, causing dielectric barrier discharge via the dielectric material, creating a state where oxygen gas and ozone gas exist in the discharge gap part, modifying the surface of the dielectric material or the surface of the second electrode contacting the discharge gap part to an oxidized surface by a mutual chemical reaction of high-field intermittent discharge plasma due to the dielectric barrier discharge and oxygen gas and ozone gas, thus adhering a photocatalyst material to the surface of the dielectric material or the metal surface of the second electrode, and removing the surface of the dielectric material or the surface of the second electrode, and using it as a photocatalyst material surface or photocatalyst material.

2. The photocatalyst material producing method as claimed in claim 1, characterized in that gas pressure in the discharge gap part or AC power injected into the discharge zone is varied in accordance with an element material to be a photocatalyst material coating the second electrode or the surface of the dielectric material, thereby controlling a predetermined power density, and removing the surface of the dielectric material or the surface of the second electrode, and using it as a photocatalyst material surface or photocatalyst material.

3. The photocatalyst material producing method as claimed in claim 1, characterized in that the metal or metal compound to be the photocatalyst contains one or more elements of Cu, In, Zn, Fe, Cr, Pb, V, W, Bi, Nb and Sr.

4. The photocatalyst material producing method as claimed in claim 1, characterized in that the purity of the oxygen gas is 99.99% or higher.

5. The photocatalyst material producing method as claimed in claim 1, characterized in that a product value of a gap length dg of the discharge gap part and a gas pressure P is defined as (P+0.1)*dg value, and the (P+0.1)*dg value is 0.14 (MPa*mm) or less.

6. The photocatalyst material producing method as claimed in claim 1, characterized in that the frequency of an AC power source that injecting AC power of the predetermined power density is set at a predetermined frequency or lower, or at 30 kHz or lower.

7. The photocatalyst material producing method as claimed in claim 1, characterized in that dilute gas to be auxiliary starting material gas is contained in the oxygen gas to enhance photocatalyst material production efficiency.

8. The photocatalyst material producing method as claimed in claim 1, characterized in that electrode cells, each including the first electrode, second electrode and dielectric material, are stacked in multiple stages or the area of the electrodes is increased to increase injected AC power, thus enabling simultaneous production of a quantity of photocatalyst material particles, a photocatalyst surface, and a plurality of photocatalyst plates.

9. The photocatalyst material producing method as claimed in claim 1, characterized in that nitrogen gas is contained in the oxygen gas and a photocatalyst material containing nitrogen is produced.

10. The photocatalyst material producing method as claimed in claim 1, wherein the oxygen gas supplied to the discharge gap part is an ozonized oxygen gas containing ozone supplied by an ozonizer.

11. The photocatalyst material producing method as claimed in claim 1, wherein the dielectric barrier discharge is a silent discharge or a creeping discharge.

12. A photocatalyst material producing method characterized by comprising forming a discharge zone with a discharge gap part defined therein by first and second electrodes facing each other and arranging a dielectric material on a surface of the first electrode facing to the second electrode, supplying a staring material gas containing metal particles or a metal compound gas to be a photocatalyst element contained in an oxygen gas to the discharge gap part, applying an AC voltage between the first electrode and the second electrode to introduce AC power of a predetermined power density into the discharge zone, causing dielectric barrier discharge via the dielectric material, creating a state where oxygen gas and ozone gas exist in the discharge gap part, and modifying the metal particles or the metal compound gas contained in the oxygen gas to photocatalyst particles by a mutual chemical reaction of high-field intermittent discharge plasma due to the dielectric barrier discharge and oxygen gas and ozone gas.

13. The photocatalyst material producing method as claimed in claim 12, characterized in that gas pressure in the discharge gap part or AC power injected into the discharge zone is varied in accordance with metal particle or metal compound gas type to be a photocatalyst element contained in the starting material gas, thereby controlling a predetermined power density.

14. The photocatalyst material producing method as claimed in claim 12, characterized in that the metal particle or metal compound gas contains one or more elements of Cu, In, Zn, Fe, Cr, Pb, V, W, Bi, Nb and Sr.

15. The photocatalyst material producing method as claimed in claim 12, characterized in that the purity of the oxygen gas is 99.99% or higher.

16. The photocatalyst material producing method as claimed in claim 12, characterized in that a product value of a gap length dg of the discharge gap part and a gas pressure P is defined as (P+0.1)*dg value, and the (P+0.1)*dg value is 0.14 (MPa*mm) or less.

17. The photocatalyst material producing method as claimed in claim 12, characterized in that the frequency of an AC power source that injecting AC power of the predetermined power density is set at a predetermined frequency or lower, or at 30 kHz or lower.

18. The photocatalyst material producing method as claimed in claim 12, characterized in that dilute gas to be auxiliary starting material gas is contained in the oxygen gas to enhance photocatalyst material production efficiency.

19. The photocatalyst material producing method as claimed in claim 12, characterized in that electrode cells, each including the first electrode, second electrode and dielectric material, are stacked in multiple stages or the area of the electrodes is increased to increase injected AC cower, thus enabling simultaneous production of a quantity of photocatalyst material particles, a photocatalyst surface, and a plurality of photocatalyst plates.

20. The photocatalyst material producing method as claimed in claim 12, characterized in that nitrogen gas is contained in the oxygen gas and a photocatalyst material containing nitrogen is produced.

21. The photocatalyst material producing method as claimed in claim 12, wherein the oxygen gas supplied to the discharge gap part is an ozonized oxygen gas containing ozone is supplied by an ozonizer.

22. The photocatalyst material producing method as claimed in claim 12, wherein the dielectric barrier discharge is a silent discharge or a creeping discharge.

23. A photocatalyst material producing apparatus characterized by comprising:

a photocatalyst material producing unit housing a first electrode, a second electrode facing this first electrode to form a discharge zone with a discharge gap part defined therein, and a dielectric material arranged on a surface of the first electrode facing to the second electrode;

oxygen supply means that supplies oxygen gas into the discharge gap part in the photocatalyst material producing unit; and an AC power source that applies an AC voltage between the first electrode and the second electrode to introduce AC power of a predetermined power density into the discharge zone and causes dielectric barrier discharge via the dielectric material;

wherein a metal or metal compound to be a photocatalyst material is applied to the second electrode or the surface of the dielectric material, a state where oxygen gas and ozone gas exist in the discharge gap part is created by the dielectric barrier discharge, and the surface of the dielectric material or the surface of the second electrode contacting the discharge gap part is modified to an oxidized surface by a mutual chemical reaction of high-field intermittent discharge plasma due to the dielectric barrier discharge and oxygen gas and ozone gas, thus adhering a photocatalyst material to the surface of the dielectric material or the metal surface of the second electrode.

24. The photocatalyst material producing apparatus as claimed in claim 23, wherein the dielectric barrier discharge is a silent discharge or a creeping discharge.

25. A photocatalyst material producing apparatus characterized by comprising:

a photocatalyst material producing unit housing a first electrode, a second electrode facing this first electrode to form a discharge zone with a discharge gap part defined therein, and a dielectric material arranged on a surface of the first electrode facing to the second electrode;

starting material gas supply means that supplies starting material gas containing metal particles or metal compound gas to be a photocatalyst element in oxygen gas to the discharge gap part in the photocatalyst material producing unit;

an ozonizer; and an AC power source that applies an AC voltage between the first electrode and the second electrode to introduce AC power of a predetermined power density into the discharge zone and causes dielectric barrier discharge via the dielectric material;

wherein a state where oxygen gas and ozone gas exist in the discharge gap part is created by the dielectric barrier discharge, and the metal particles or the metal compound gas contained in the oxygen gas is modified to photocatalyst particles by a mutual chemical reaction of high-field intermittent discharge, plasma due to the dielectric barrier discharge and oxygen gas and ozone gas.

26. The photocatalyst material producing apparatus as claimed in claim 25, wherein the dielectric barrier discharge is a silent discharge or a creeping discharge.

\* \* \* \* \*